(12) United States Patent
Molina et al.

(10) Patent No.: US 10,298,170 B2
(45) Date of Patent: May 21, 2019

(54) PHOTOVOLTAIC MOUNTING SYSTEM

(71) Applicant: SolarCity Corporation, San Mateo, CA (US)

(72) Inventors: David Molina, Oakland, CA (US); Geoffrey John Fedoroff, San Francisco, CA (US)

(73) Assignee: SolarCity Corporation, San Mateo, CA (US)

( * ) Notice: Subject to any disclaimer, the term of this patent is extended or adjusted under 35 U.S.C. 154(b) by 9 days.

(21) Appl. No.: 15/195,914

(22) Filed: Jun. 28, 2016

(65) Prior Publication Data

US 2017/0264235 A1    Sep. 14, 2017

Related U.S. Application Data

(60) Provisional application No. 62/308,125, filed on Mar. 14, 2016.

(51) Int. Cl.
| | |
|---|---|
| *A47G 29/02* | (2006.01) |
| *H02S 20/23* | (2014.01) |
| *F16B 5/06* | (2006.01) |
| *F24S 25/615* | (2018.01) |
| *F24S 25/636* | (2018.01) |

(52) U.S. Cl.
CPC ............ *H02S 20/23* (2014.12); *F16B 5/0621* (2013.01); *F24S 25/615* (2018.05); *F24S 25/636* (2018.05); *Y02B 10/12* (2013.01)

(58) Field of Classification Search
CPC ........ H02S 20/23; F24J 2/5249; F24J 2/5258; F16B 5/0621

USPC .......... 248/237, 316.7, 316.1; 52/555, 173.7, 52/173.3, 710
See application file for complete search history.

(56) References Cited

U.S. PATENT DOCUMENTS 9,722,532 B2 * 8/2017 Almy ...................... H02S 20/23
9,923,509 B2 * 3/2018 Almy ...................... H02S 20/23
(Continued)

FOREIGN PATENT DOCUMENTS

DE   20 2013 005102 U1   9/2014
FR      3 004 242 A1    10/2014
(Continued)

OTHER PUBLICATIONS

International Search Report, dated May 4, 2017, for corresponding International Patent Application No. PCT/US2016/068727, 4 pages.
(Continued)

*Primary Examiner* — Todd M Epps
(74) *Attorney, Agent, or Firm* — Kilpatrick Townsend & Stockton LLP

(57) ABSTRACT

A photovoltaic mounting system having an elongated connector base. The elongated connector base can included photovoltaic module connector portion for supporting a pair of elevated photovoltaic modules above the base. The base may include a captive screw system for holding a pair of mounting screws in place prior to installation and functioning as a screw guide during installation. An assistance clamp fits over the elongated base under the photovoltaic module connector portion to secure the elongated connector base to relatively narrow portion of a roof to provide lateral stability to the elongated connector base.

14 Claims, 23 Drawing Sheets

(56) References Cited

U.S. PATENT DOCUMENTS

| | | | |
|---|---|---|---|
| 2014/0175244 A1 | 6/2014 | West et al. | |
| 2014/0261638 A1 | 9/2014 | Haddock et al. | |
| 2014/0311087 A1 | 10/2014 | Haddock | |
| 2016/0111998 A1 | 4/2016 | Schmid et al. | |
| 2016/0248367 A1* | 8/2016 | Almy | H02S 20/23 |
| 2017/0264235 A1* | 9/2017 | Molina | H02S 20/23 |

FOREIGN PATENT DOCUMENTS

| | | | | |
|---|---|---|---|---|
| JP | 2005-264618 A | | 9/2005 | |
| JP | 2005264618 A | * | 9/2005 | H02S 20/23 |
| KR | 2013 0130276 A | | 12/2013 | |
| WO | 2012/116223 A2 | | 8/2012 | |

OTHER PUBLICATIONS

Written Opinion, dated May 4, 2017, for corresponding International Patent Application No. PCT/US2016/068727, 7 pages.

* cited by examiner

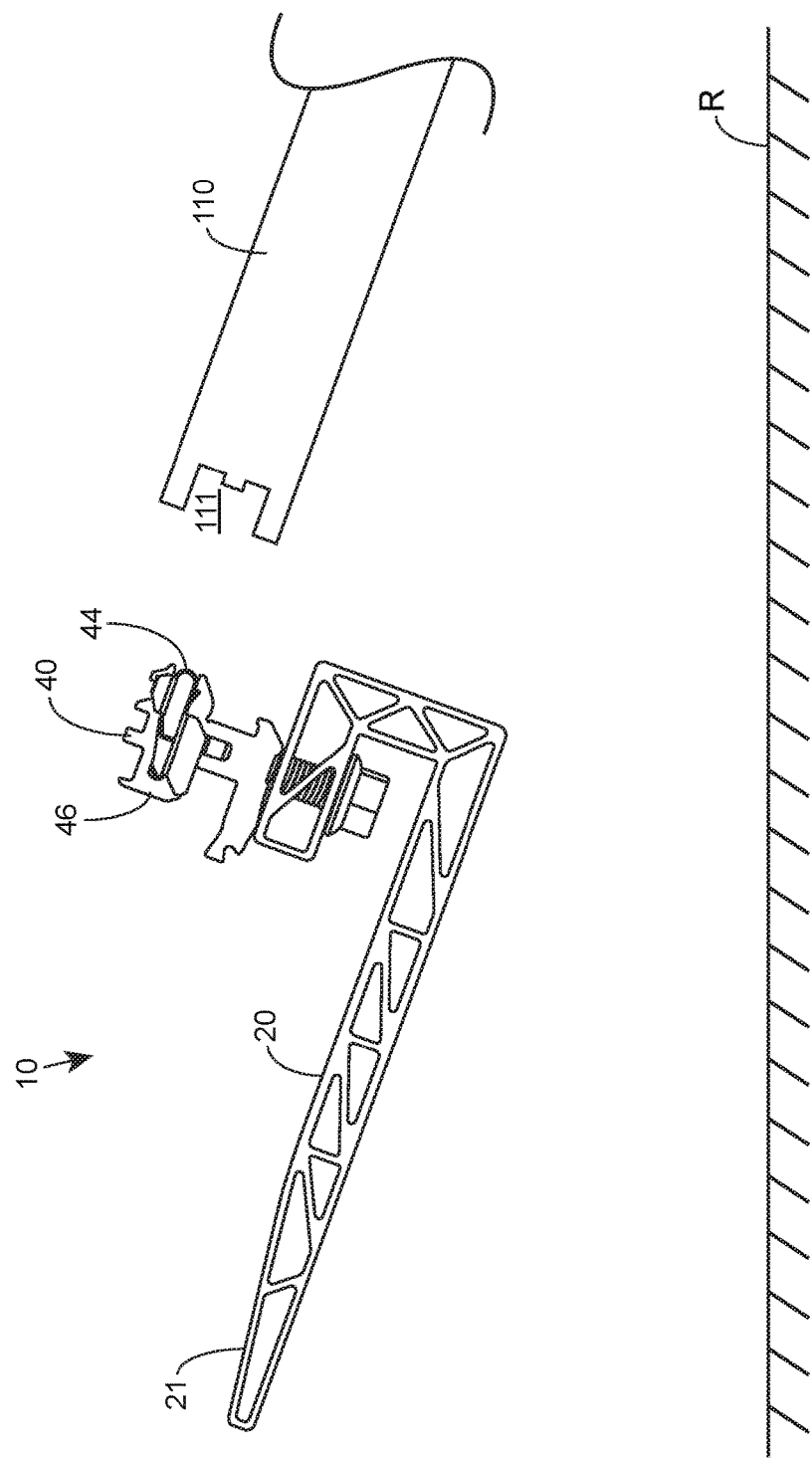

PHOTOVOLTAIC MOUNTING SYSTEM

CROSS-REFERENCES TO RELATED APPLICATIONS

This claims the benefit of U.S. Provisional Application No. 62/308,125, filed on Mar. 14, 2016, which is incorporated by reference herein.

RELATED APPLICATIONS

This is related to U.S. patent application Ser. No. 14/836,807, entitled "Manual Snap-On Photovoltaic Mounting System for Rapid Installation of Photovoltaic Arrays Onto Metal Roofs", filed Aug. 26, 2015, which claims the benefit of U.S. Provisional Patent Application No. 62/171,443, entitled "Manual Snap-On Photovoltaic Mounting System for Rapid Installation of Photovoltaic Arrays Onto Metal Roofs", filed Jun. 5, 2015; and U.S. Provisional Patent Application No. 62/203,822, entitled "Manual Snap-On Photovoltaic Mounting System for Rapid Installation of Photovoltaic Arrays Onto Metal Roofs", filed Aug. 11, 2015, all of which are incorporated herein by reference in their entirety for all purposes.

TECHNICAL FIELD

The present invention relates to mounting photovoltaic arrays.

BACKGROUND OF THE INVENTION

Many systems currently exist for mounting photovoltaic arrays onto trapezoidal metal roofs (a roof type that is especially common in Europe). Unfortunately, these existing systems often are complex, involve many parts, are expensive, and take an undesirably long time to install. Moreover, the installation of these systems typically requires specialized tools, or a number of different tools. What is instead desired is a mounting system that can be installed very rapidly on a metal roof and is also easily handled by an installer.

Trapezoidal roof mounting systems are not secured into building rafters. Instead, they are usually secured to the metal roofing material itself above the rafter. This is because the rafters typically run perpendicular to the peaks of the metal roofing material. As a result, these systems must be firmly attached directly to the metal roofing surface. In most existing systems, screws are driven directly through the metal roofing material. This can present several problems. First, working with small screws requires installers to fumble with small, loose parts while on the roof, as he or she tries to position and fasten them. Second, due to heat, any rooftop solar system, and in particular one located on a thermally conductive metal roof needs to have sufficient flexibility to account for thermal expansion and contraction through thousands of thermal cycles over the lifetime of a system. This problem is not addressed by mounting systems that are simply screw-fastened onto metal roofs. Third, due to the large number of parts used, existing trapezoidal roof mounting systems typically require excessive time to install. Fourth, existing trapezoidal roof mounting systems typically do not provide for module-to-module grounding; separate grounding wires typically need to be attached to these mounting systems.

BRIEF SUMMARY OF THE INVENTION

The present system provides a photovoltaic mounting system that can be manually installed easily and quickly while still providing adequate security. The present system can include a single assembly that can be installed in a simple continuous motion. All of the fastening mechanisms used both to connect one photovoltaic module to another and to connect the photovoltaic array to the roof can be contained within a single, hand-held assembly. As a result, no extra fasteners or components are needed.

During installation, one embodiment of the present assembly can be snapped onto the edge of a first photovoltaic module when the edge of the module is held up in the air by the installer. The assembly can then be lowered onto the roof and function as a temporary kickstand until the assembly is securely attached to the roof. After the assembly is attached, it can provide a convenient platform for a second photovoltaic module to be attached thereto. This process can be repeated such that an array of photovoltaic modules can be quickly laid out on the roof.

The present system is well suited for use with trapezoidal metal roofs, and may include a pair of self-tapping screws that enables direct attachment to such roofs. Several optional systems are provided for preventing the self-tapping screws from falling out of the mounting assembly during installation. As a result, the installer can manually snap the mounting system onto the first module, lower the module onto the roof, and secure the mounting assembly by driving the self-tapping screws through the metal without the possibility of losing or having to fumble with loose screws.

In one embodiment, the assembly has a narrow elongated base that can be easily held by the installer with one hand. Such an assembly may function as a lever when rotating the connector portion into a groove formed in a photovoltaic (PV) module frame to lock it onto the side edge of the PV module's frame.

Preferably, the present assembly permits some module-to-module movement and or alignment during and after installation of the array. This can be accomplished by a module-to-module connector that may optionally slide, pivot and/or rotate slightly with respect to the main body of the assembly. In some embodiments, it may be necessary to pivot the assembly in the opposite direction of attachment to release the connector portion from the groove in the PV module frame to allow it to be slid laterally along the frame to the desired location.

A further advantage of the present system is that it can used to design an array that does not require module-to-module interlocks (e.g.: interlocks that are not supported from below) in addition to supporting feet that connect one module to another. Traditional grooved frame and standard frame arrays involve two different structures—feet that support the array above the roof (that typically also connect modules together), and interlock connectors that connect adjacent modules together (but are not necessarily supported from below). The use of these two different structures has become a common way to position the feet that support the array at locations that may best correspond to preferred roof connection points. By contrast, the present system uses only one type of connector assembly. Preferably, the present connector is positioned to support each module at four locations around its frame, without the need for secondary module-to-module interlock-style connectors and the without requiring that the assemblies be positioned directly over one of the roof rafters.

A further advantage of the present system is that it can be mounted to trapezoidal metal roofs, while providing lateral stability. Such systems can make use of assistance clamps that connect to side portions of the trapezoidal roofs. The assistance clamps can take the form of a strap that can be placed into tension over a portion of a narrow elongated base by securing it with mounting screws to either side of the trapezoidal projection. This additional feature may allow such a PV mounting system to be used in coastal areas with high winds.

BRIEF DESCRIPTION OF THE DRAWINGS

FIG. 15A is a first step in assembling a photovoltaic array using amounting system according to various embodiments of the invention.

DETAILED DESCRIPTION OF THE INVENTION

The present system can provide a mounting assembly for simple installation of photovoltaic module arrays, and is well suited for (but not limited to) use with trapezoidal metal roofs. During installation, the present assembly can be manually snapped onto a first photovoltaic module by an installer holding one end of the module in the air while also holding the present assembly with their other hand. Next, the assembly can be placed on the roof like a kickstand for final adjustment to the desired location before being attached to the roof (while the assembly supports the first module thereon). Next, a second module can be attached onto the PV module connector portion of the assembly. In preferred embodiments, the attachment technique to the first PV module involves rotation of the PV module connector portion into a groove formed in a PV module frame, using the elongated base portion as a torque lever. The attachment technique of the second or subsequent module involves pivoting the groove of the second or subsequent module on to the other side of the PV module connector portion so that the protrusion fits into the groove, and pivoting the module down toward the roof so that the connector portion and frame become securely attached. As a result, the present system is easy and intuitive for an installer to use since a preferred method of installation may involve a continuous rotational movement of the installers hands. In preferred aspects, Any peripheral connectors (e.g., on the outer edge of the array) that are not connected to a subsequent or adjacent module in the same row or column may be connected by simply pivoting the connector portion into the groove of the module frame. By repeating this preferred method of assembly, a plurality of photovoltaic modules can be laid out in columns or rows upon a roof. Advantageously, by using the mounting system according to the various embodiments of the invention, the installer need not reach back over an installed module after the module has been positioned in the array. This affords the installer the ability to work in one continuous direction quickly, and without stretching across the top of a photovoltaic module after the module has been installed, or putting his or her entire body weight on an installed module.

Figure 1:
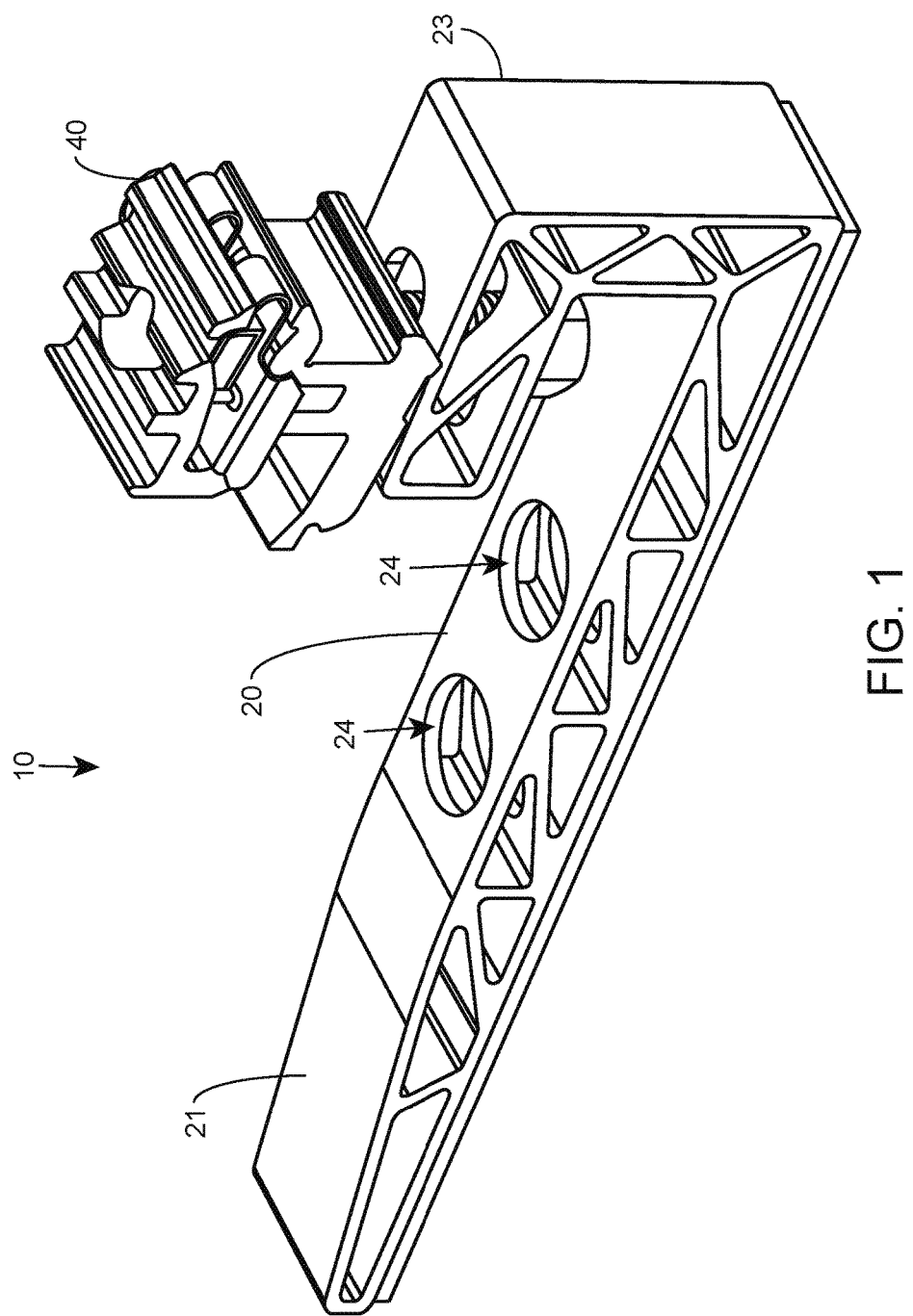
FIG. 1 is a perspective view of the mounting system according to various embodiments of the invention.
Figure 2:
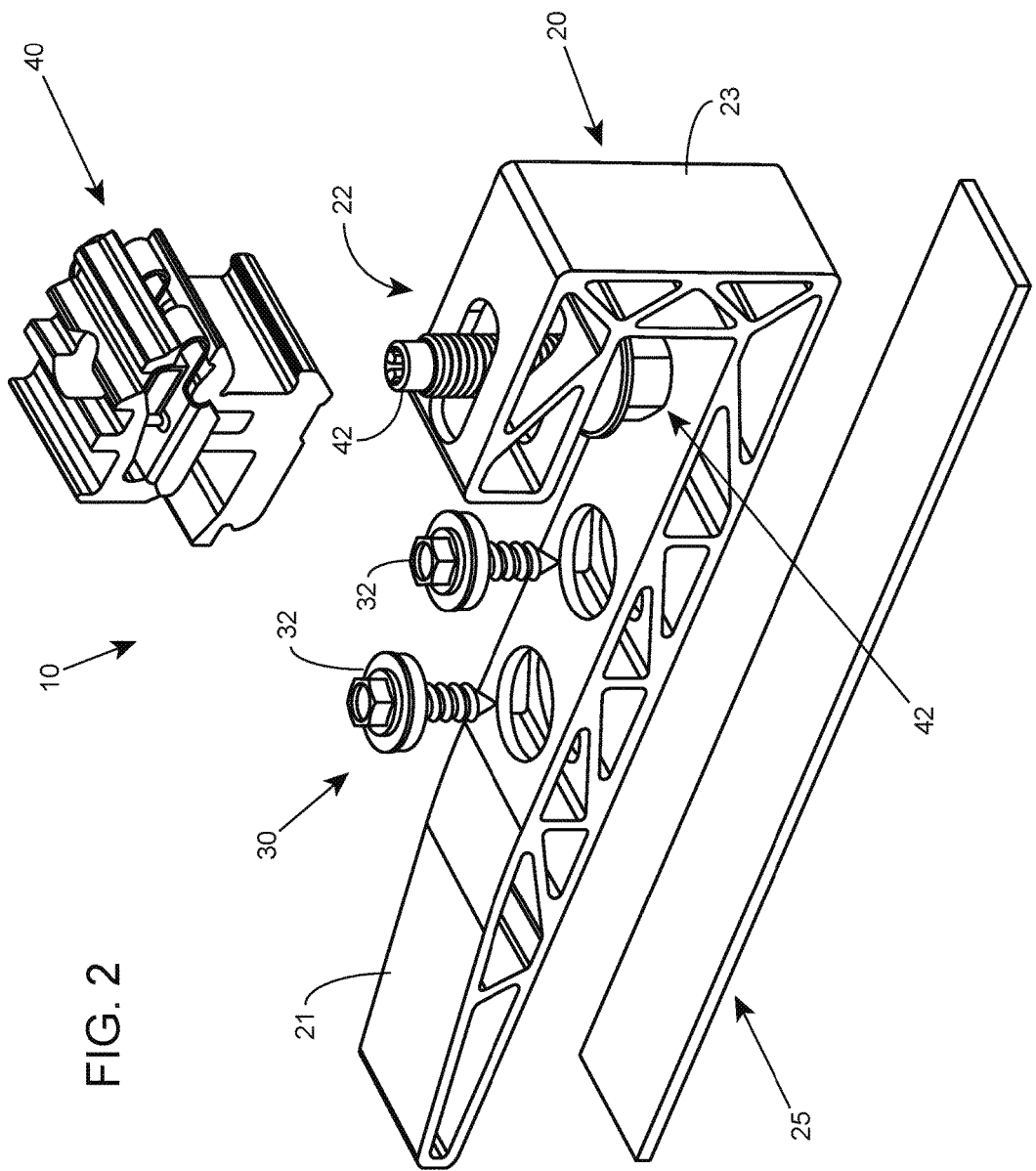
FIG. 2 is an exploded perspective view of the exemplary system of FIG. 1.
Figure 3:
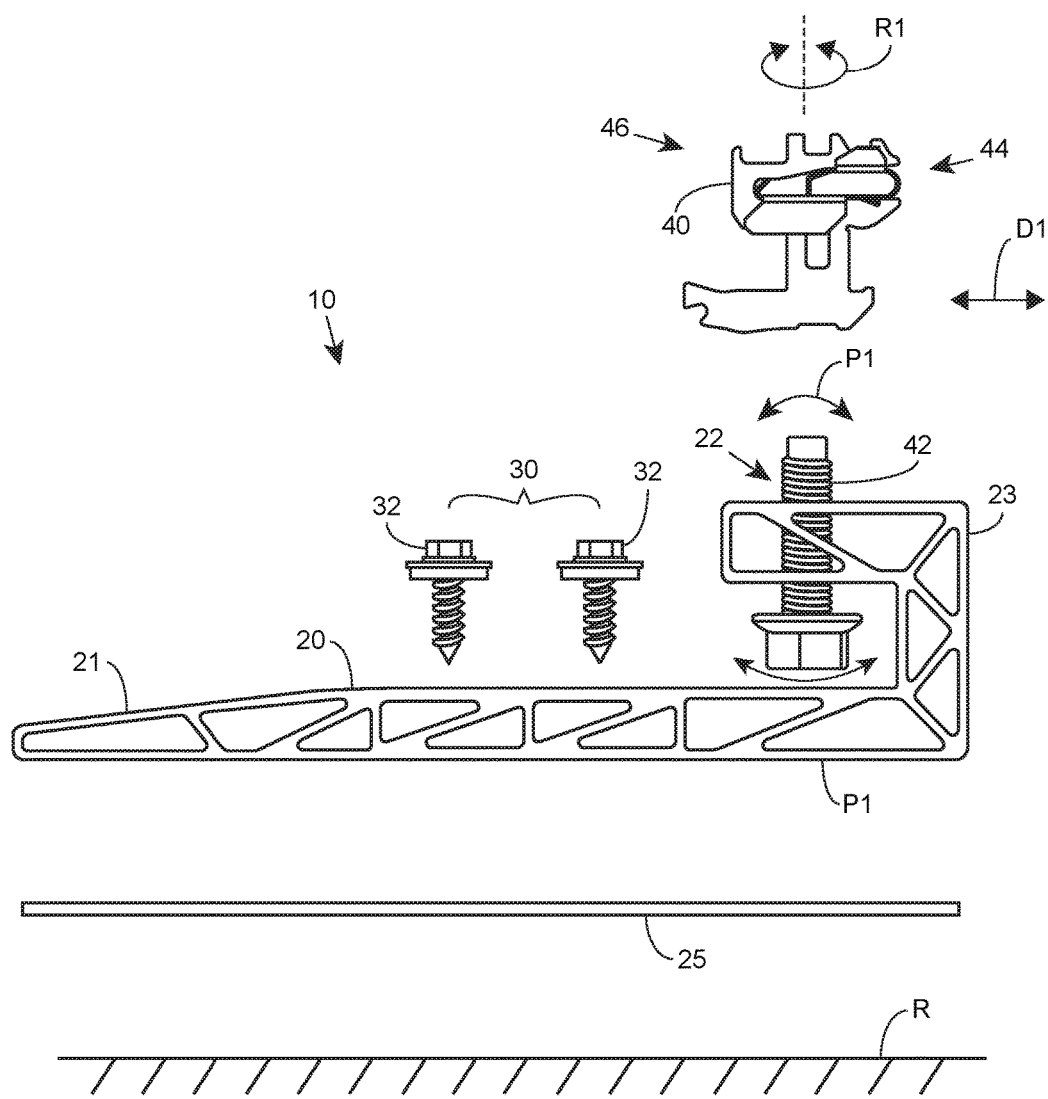
FIG. 3 is a side elevation view of the exemplary system of FIG. 1.

FIGS. 1-3 show one embodiment of an assembly for use with a mounting system according to various embodiments of the invention. Exemplary assembly 10 includes elongated base 20, attachment mechanism 30 (optionally being a pair of screws 32) on the elongated base for attaching the elongated base 20 onto roof R, and photovoltaic module connector portion 40. In various embodiments, elongated base 20 may be formed as an extrusion. This has the advantage of reducing the cost of fabrication, both due to the speed at which extrusions are made, which can have a trussed structure, the amount of material required may also be reduced. Optional sealing base 25 can be provided on the bottom of base 20. Sealing base 25 may be made of rubber or other suitable compressible, water resistant material to provide a tight seal onto metal roof R. As best seen in FIG. 3, elongated base 20 may be generally J-shaped, with photovoltaic module connector 40 mounted onto hook end 23 of the J-shaped base. An advantage of using such a J-shape is that it acts as a fulcrum when manually rotating and thus attaching connector 40 to the modules. At the opposite end to the hook end 23 is narrow tapered end 21. As will be explained, an installer can hold onto tapered end 21 and use it as a torque lever when rotating PV module connector portion 40 into the frame of a PV module. Screws 32 can hold base 20 onto the roof and photovoltaic module connector 40 can hold one photovoltaic module onto another.

Photovoltaic module connector portion 40 can be mounted at hook end 23 of elongated base 20 as shown.

Photovoltaic module connector portion 40 can be dimensioned to support first and second photovoltaic modules (110 and 120 in FIGS. 13 to 15F) on opposite sides thereof. As will be explained below, and as illustrated in FIGS. 15A to 15F, photovoltaic module connector portion 40 may also be dimensioned to lock onto first photovoltaic module 110 when elongated base 20 is held and rotated downwardly by hand with respect to first photovoltaic module 110. In addition, as will also be explained in FIGS. 15A to 15F, photovoltaic module connector portion 40 is also dimensioned to receive the second photovoltaic module 120 thereon after elongated base 20 has been positioned onto the roof (and after photovoltaic module connector portion 40 has been fastened onto first photovoltaic module 110).

As shown in the Figures, attachment mechanism 30 for securing elongated base 20 onto the metal roof may include one, two, or more self-tapping screws 32. As commonly understood, a self-tapping screw is a screw that forms its own hole as it is driven into it instead of requiring a pre-drilled hole. This is typically accomplished by using a screw made of a hard material, having a sharp point and/or an aggressive thread pattern. An advantage of self-tapping screws is that they bite into the metal without producing metal residue around the hole that the rotating action of the screw create. Rather, the metal is compressed laterally outwardly as the self-tapping screw is advanced. In alternate embodiments, a rivet can be used with the holes for the rivet being pre-drilled into base 20.

Once elongated base 20 (and optional rubber sealing base 25) are positioned on top of roof R at the desired location (e.g. on top of a raised trapezoidal portion), screws 32 may then be tightened to secure elongated base 20 directly onto the metal roof. In various embodiments, screws 32 need only penetrate the sheet metal of the metal roof R and need not be anchored into a rafter below. This is because the rafters typically extend in the North-South direction, parallel to the direction in which metal peaks in a trapezoidal roof run, so there is very little chance that these two structures will intersect. As the present system is typically installed onto the metal peaks, it is not also connected into the rafters of the building since the system is often not positioned above the building rafters, and even when it is, the trapezoidal projections will create an air gap between them. Top ends of screws 32 are accessible through holes 24 in base 20. Holes 24 permit the installer to simply tighten screws 32 from above, such that the installer's power driver can face directly downward during the installation process.

As seen in FIGS. 2 and 3, photovoltaic module connector portion 40 may be connected to hook end 23 of J-shaped elongated base 20 by attachment bolt 42 passing upwardly through slot 22 formed in hook end 23 of the J-shaped elongated base. Slot 22 may have a length sufficient to permit attachment screw 42 to pivot slightly back and forth in direction P1 (FIG. 3) and thereby permit photovoltaic module connector portion 40 to pivot in direction P1. Optionally, slot 22 can also permit photovoltaic connector portion 40 to slightly rotate around axis R1, and also to slide slightly back and forth in direction D1 prior to the installer tightening photovoltaic module connector portion 40 onto attachment bolt 42. These adjustment features need not be part of the normal mounting process since bolt 42 may typically hold module connector firmly in place during installation. As a result, the installer need not be required to even adjust bolt 42 during normal installation. However, the range of movement afforded to connector portion 40 by slot 22 can provide installation advantages. Moreover, if for some reason a photovoltaic module needs to be removed and re-installed after the array has already been built, the geometry of slot 22 will allow some flexibility both in removing and re-positioning the modules (since base 20 will remain secured onto roof R during removal and re-installation of the defective module).

Figure 4:
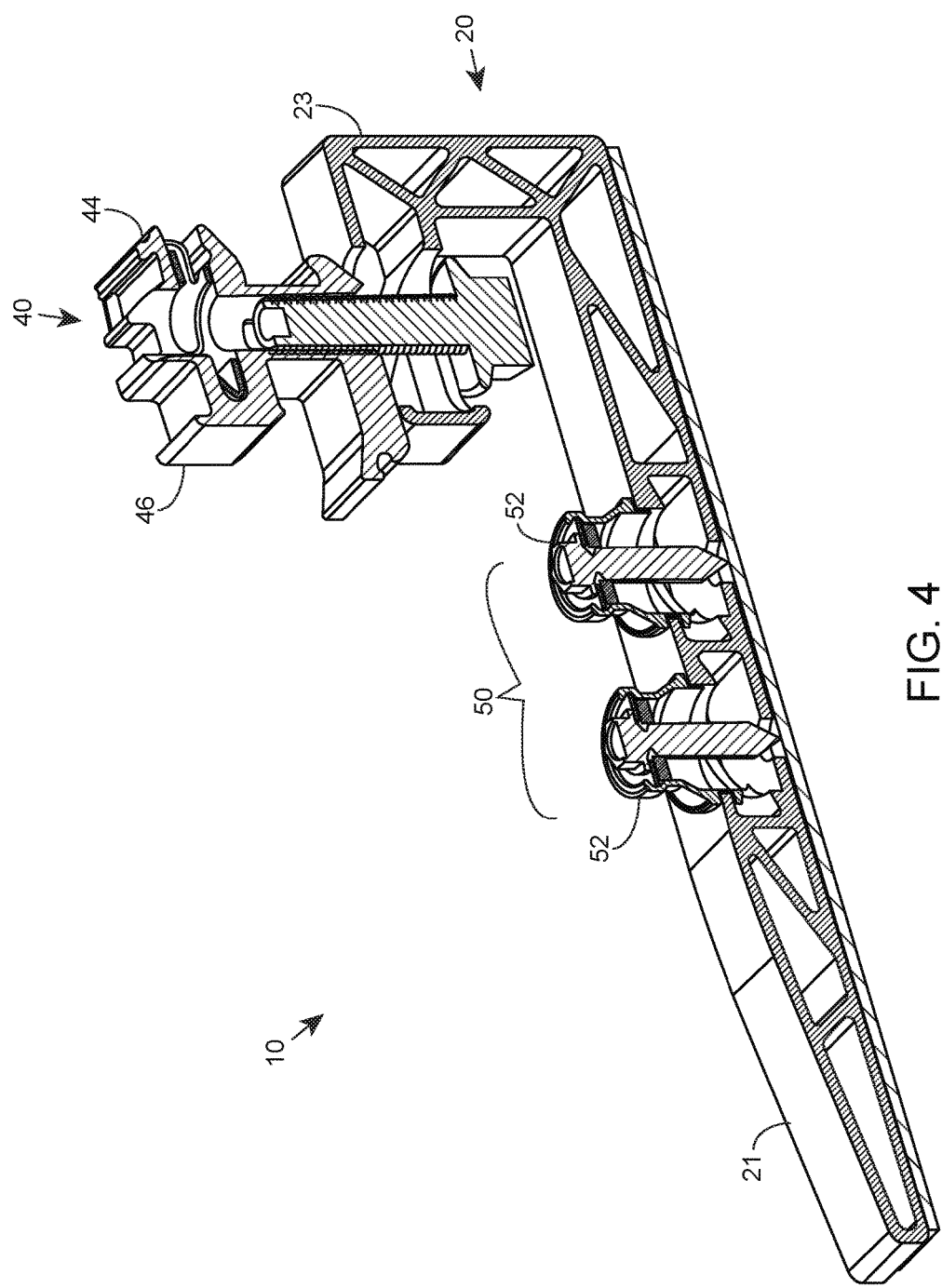
FIG. 4 is a cut-away perspective view of the exemplary mounting system of FIG. 1.
Figure 5:
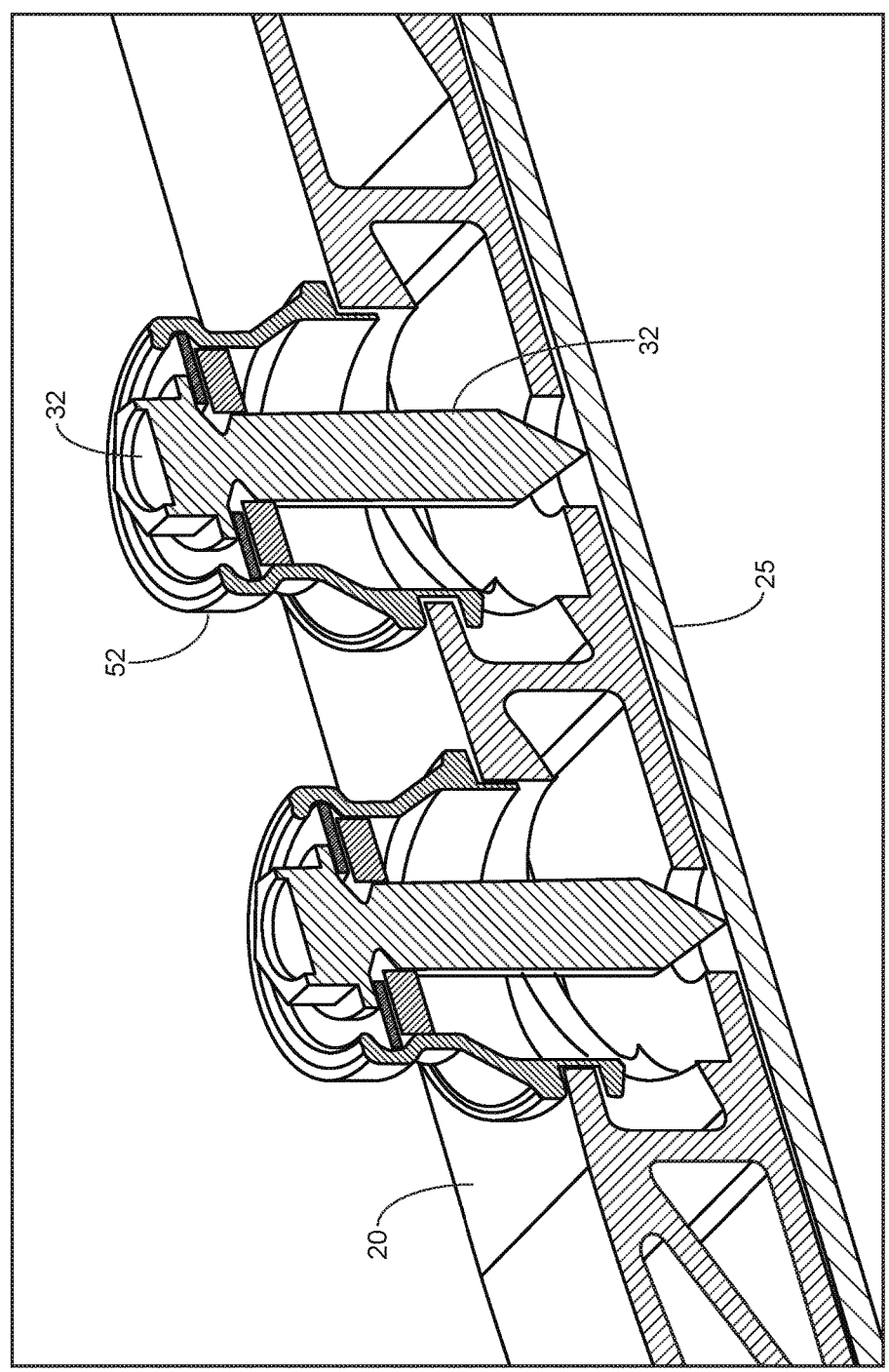
FIG. 5 is a close-up cut-away view corresponding to FIG. 4.
Figure 6:
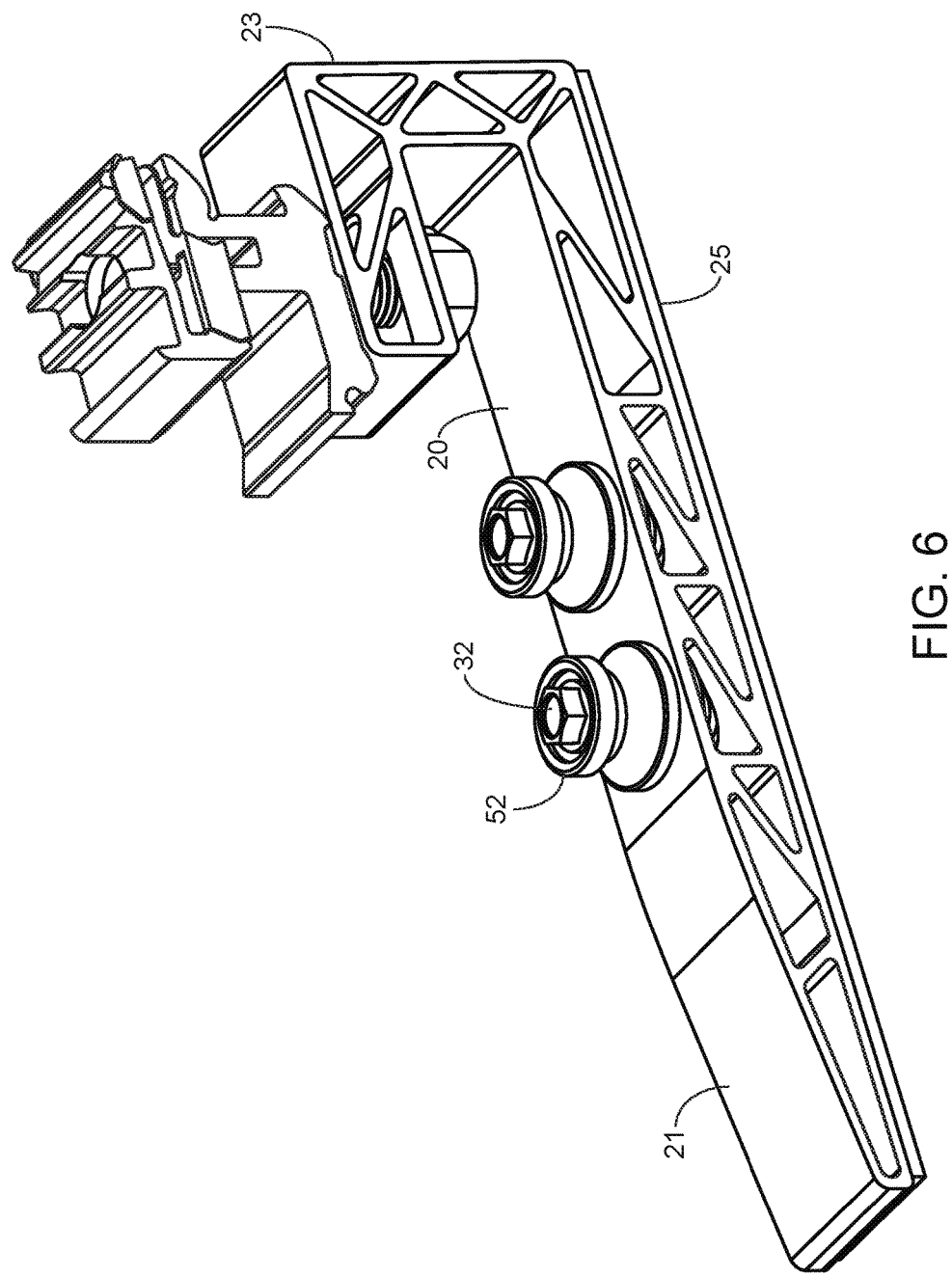
FIG. 6 is another close-up perspective view corresponding to FIG. 4.
Figure 7:
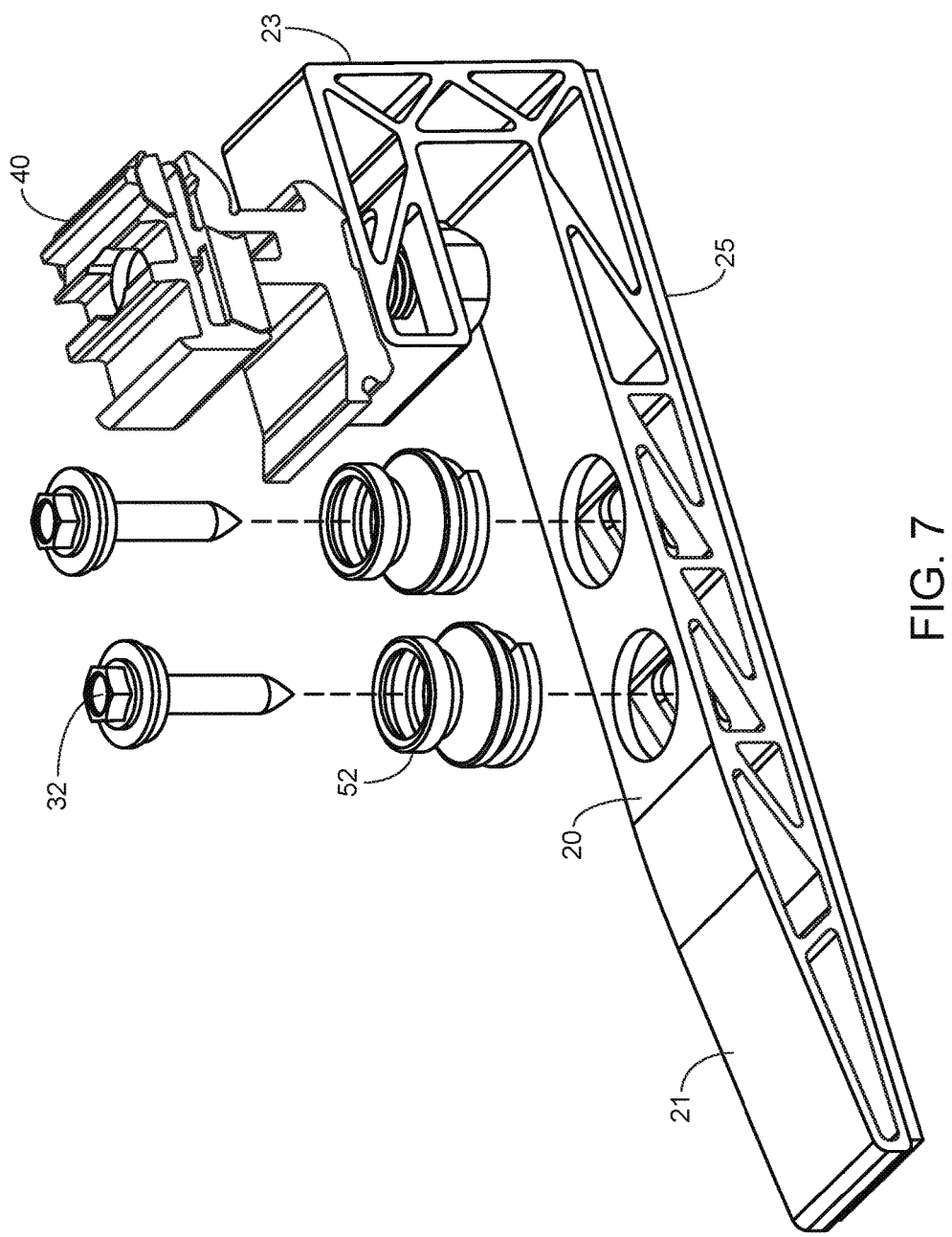
FIG. 7 is an exploded perspective view corresponding to FIG. 6.

FIGS. 4 to 7 show an embodiment of mounting assembly 10 further incorporating optional rubber gasket system 50 for preventing screws 32 from falling out of the screw holes 24 prior to or during installation. In one embodiment, system 50 includes a pair of flexible (or rigid) screw holders 52 for holding self-tapping screws 32 in placer. It is to be understood that although two fasteners are shown in FIG. 4, different numbers of fasteners may be used, all keeping within the scope of the present invention. In operation, each flexible screw holder 52 simply holds its associated screw 32 in the downwardly facing orientation shown (with the top head of each screw 32 supported by a flange that extends inwardly around the neck of each screw 32). When an installer tightens screw 32 into sheet metal below base 20, flexible screw holder 52 will bend and/or compress in height. As such, as the bottoms of screws 32 pass through bottom holes in extruded base 20, and the top ends of screw 32 will drop down until the top ends of screws 32 become essentially flush with the top side of the bottom panel of base 20. At this time, flexible screw holder 52 will become substantially, or even fully compressed. The advantage of using flexible screw holders 52 is that screws 32 do not simply fall out of extruded base 20 when an installer is handling mounting system 10 or even during transport. Rather, the screws remain captive in assembly 10 such that the installer can hold and rotate assembly 10 to attach it onto a photovoltaic module without having to worry about fastening screws 32 ever becoming lost before they are torqued into the metal roof pan. Moreover, the installer does not have to fumble around looking for fastening screws in their pockets after mounting assembly 10 has been placed onto roof R. In addition, flexible screw holder 52 remains attached to assembly 10 after screws 32 have been installed. As a result, there are no screw holders littering the jobsite that have to be cleaned up after installation.

Figure 8:
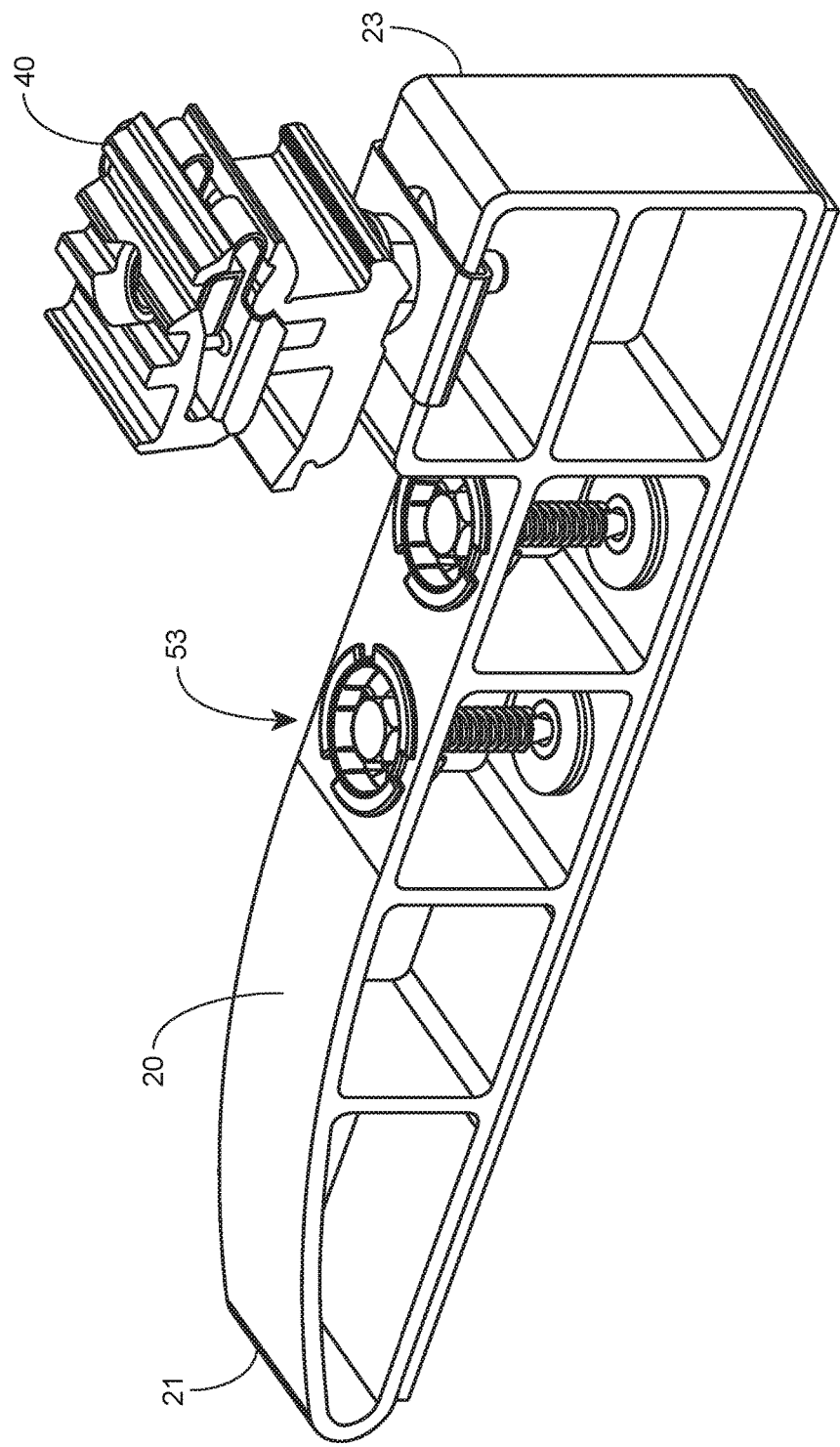
FIG. 8 is a perspective view of an exemplary mounting system according to an alternate embodiment of the invention, showing an optional captive-screw system for attaching a pair of self-tapping screws to the elongated base.
Figure 9:
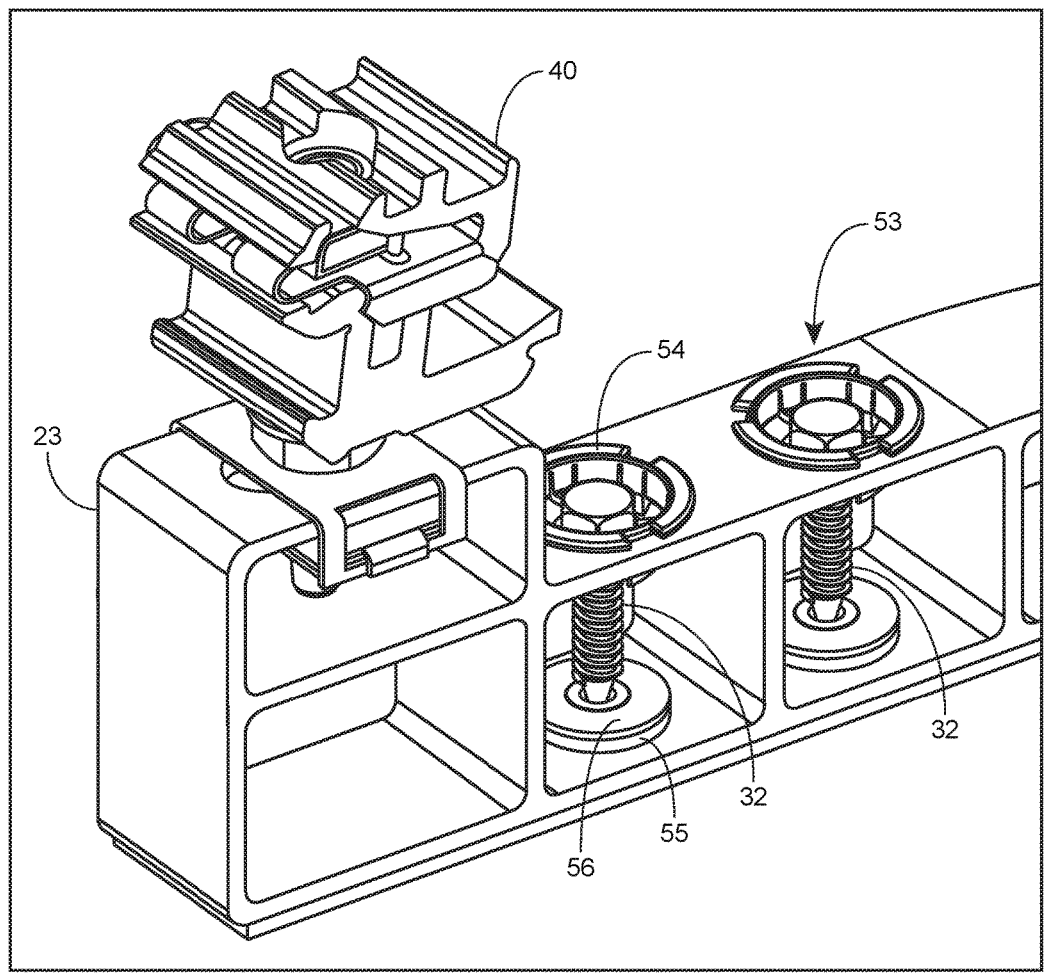
FIG. 9 is a close-up view of the captive-screw system of FIG. 8.
Figure 9:
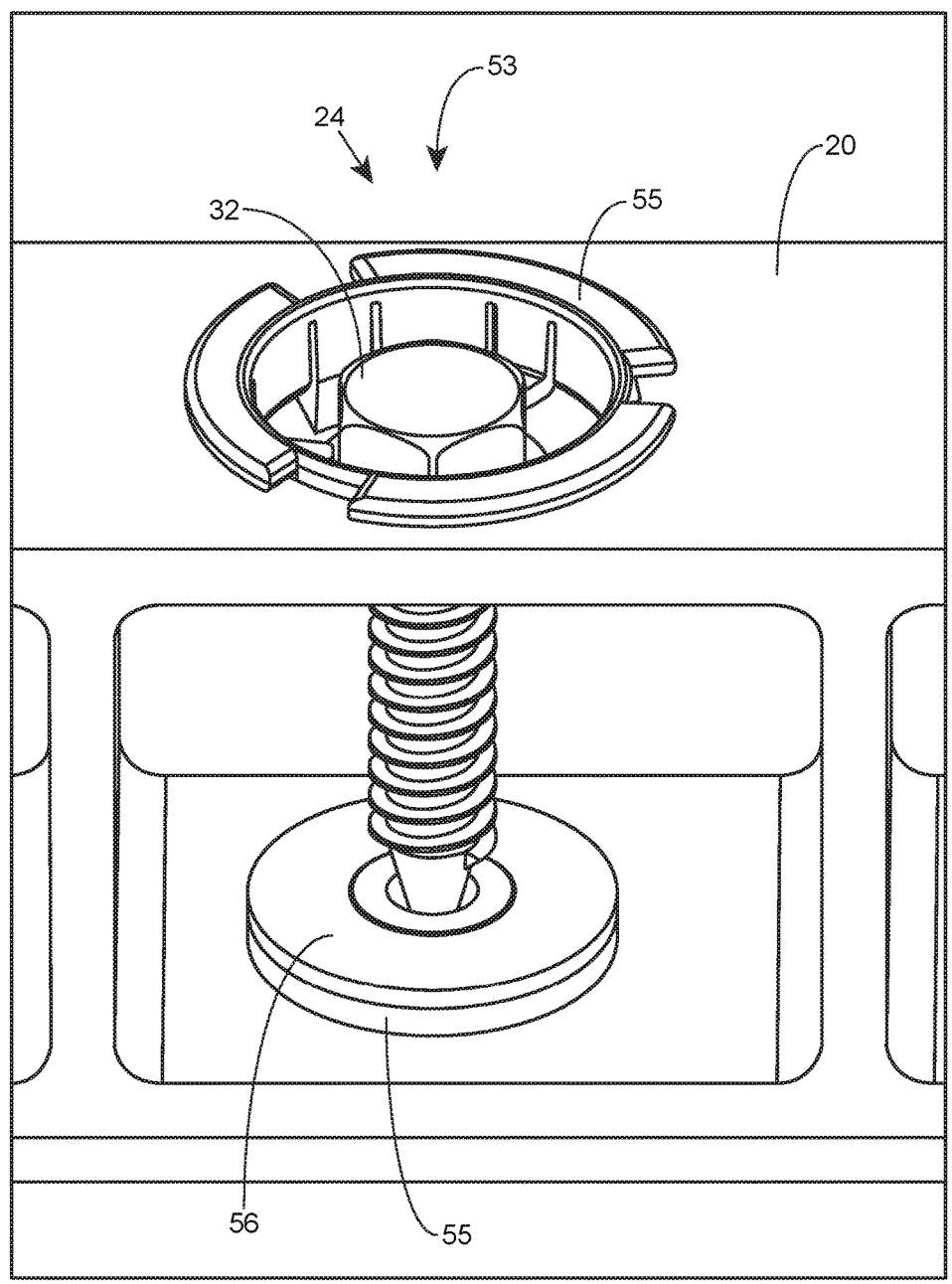

FIGS. 8 and 9 show an alternative captive screw holding system 53 for preventing screws 32 from falling out of the screw holes passing through elongated base 20 during installation. Screw holding system 53 may include deformable or breakable support 54 that holds the top end of screw 32 in an upright position with respect to base 20. Foam pad 55 can be positioned underneath support 54 and gasket 56 (optionally made of EPDM—ethylene propylene diene monomer) is positioned on top of foam pad 55. In operation, the installer can use a power screwdriver to turn screws 32. When screw 32 begins to turn, the head of screw 32 breaks away from support 54 and tightens down onto gasket 56 and foam pad 55. Foam pads 55 and gaskets 56 operate to provide a support surface for the head of screw 32 when it is screwed downwardly into roof R. As also shown in FIGS. 8 and 9, tapered end 21 of base 20 may be gently curved to provide an ergonomically shaped handle for the installer to hold onto. Moreover, the number of internal panels making up the trussed structure can be reduced as compared to the embodiment of FIG. 1. In the embodiment shown in FIGS. 8 and 9, the internal panels making up the trussed structure can simply be vertical and horizontal. Deformable or breakable support 54 may consist of any structure that holds the top ends of screws 32 near the top of base 20 while the bottom ends of screws 32 are near the bottom of base 20. For example, breakable support 54 may include fingers or projections that wrap around the top of screw 32 to hold screw 32 in place. Next, as the installer rotates screw 32 (for example, with a power driver), it moves downwardly such that the top of screw 32 disconnects from breakable support 54. Breakable support 54 holds screw 32 regardless of the orientation of assembly 10. As a result, an installer can hold assembly 10 upside down or sideways, and screw 32 will not fall out of the assembly. Moreover, screw holder 54 may remain in hole 24 for the life of the product. As such, screw holders 54 need not be retrieved from the jobsite after installation of the photovoltaic array.

Figure 10:
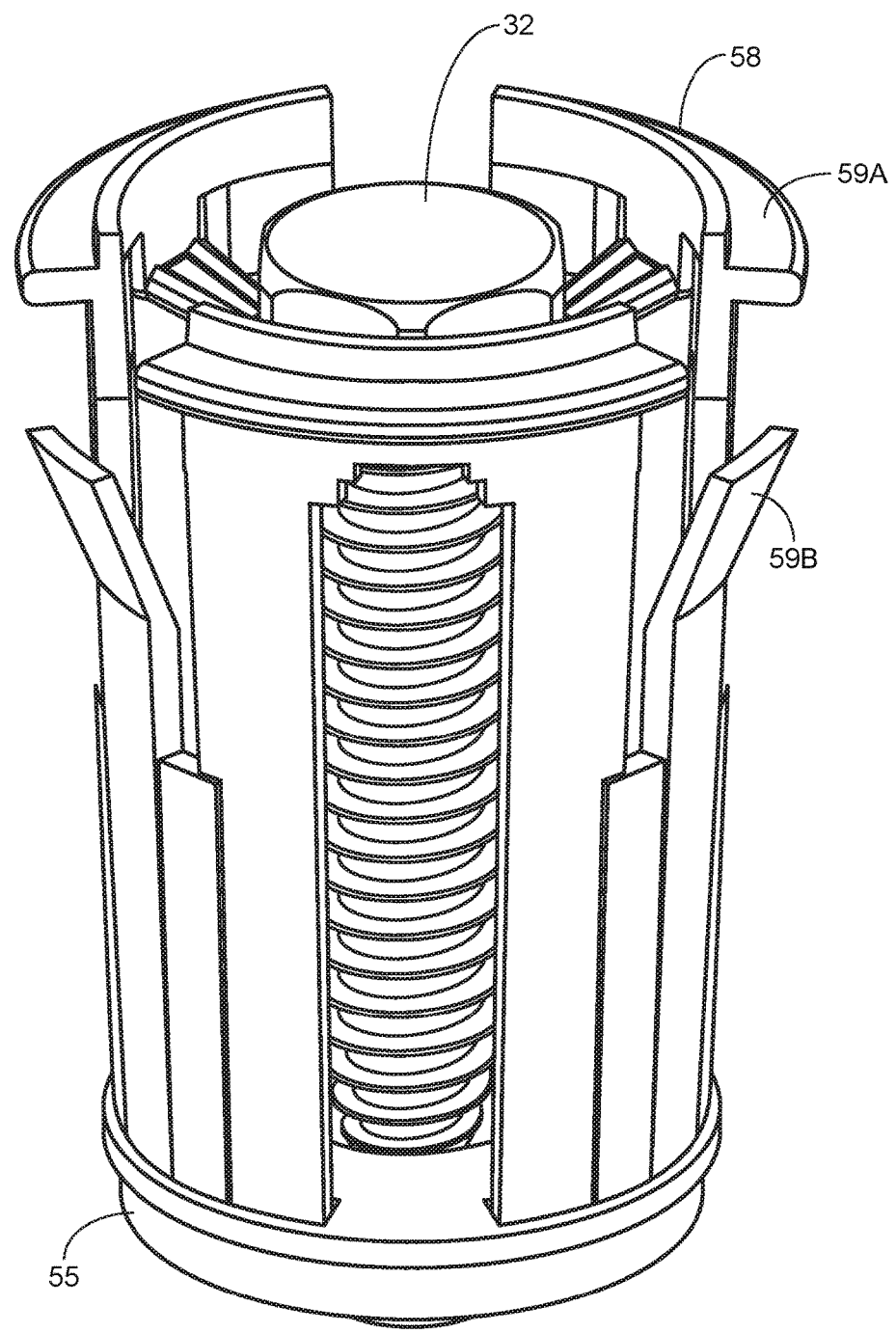
FIG. 10 is captive-screw system according to another exemplary embodiment of the invention.

FIG. 10 shows another optional captive fastener system in which screw 32 is supported in cartridge-like structure 58, which is inserted into the same hole 24 that breakable support 54 was inserted into in FIGS. 8 and 9. Cartridge 58 may have upper catches 59A and lower catches 59B. When cartridge 58 is pushed down into hole 24, lower catches 59B spring outwardly to hold cartridge 58 into position, such that cartridge 58 remains within assembly 10. Next, after assembly 10 has been placed onto the roof surface at the desired location, the installer simply uses a power screwdriver to turn each screw 32, with screw 32 moving down through the bottom of base 20, and into the metal roof below. Similar to breakable support 54 described above, cartridge 58 may include inwardly facing fingers or protrusions that hold onto the top end of screw 32 such that screw 32 does not fall out of cartridge 58 as the installer holds and rotates assembly 10. An advantage of this embodiment is that an installer could replace entire cartridge 58 in the event of a defective cartridge.

Figure 11:
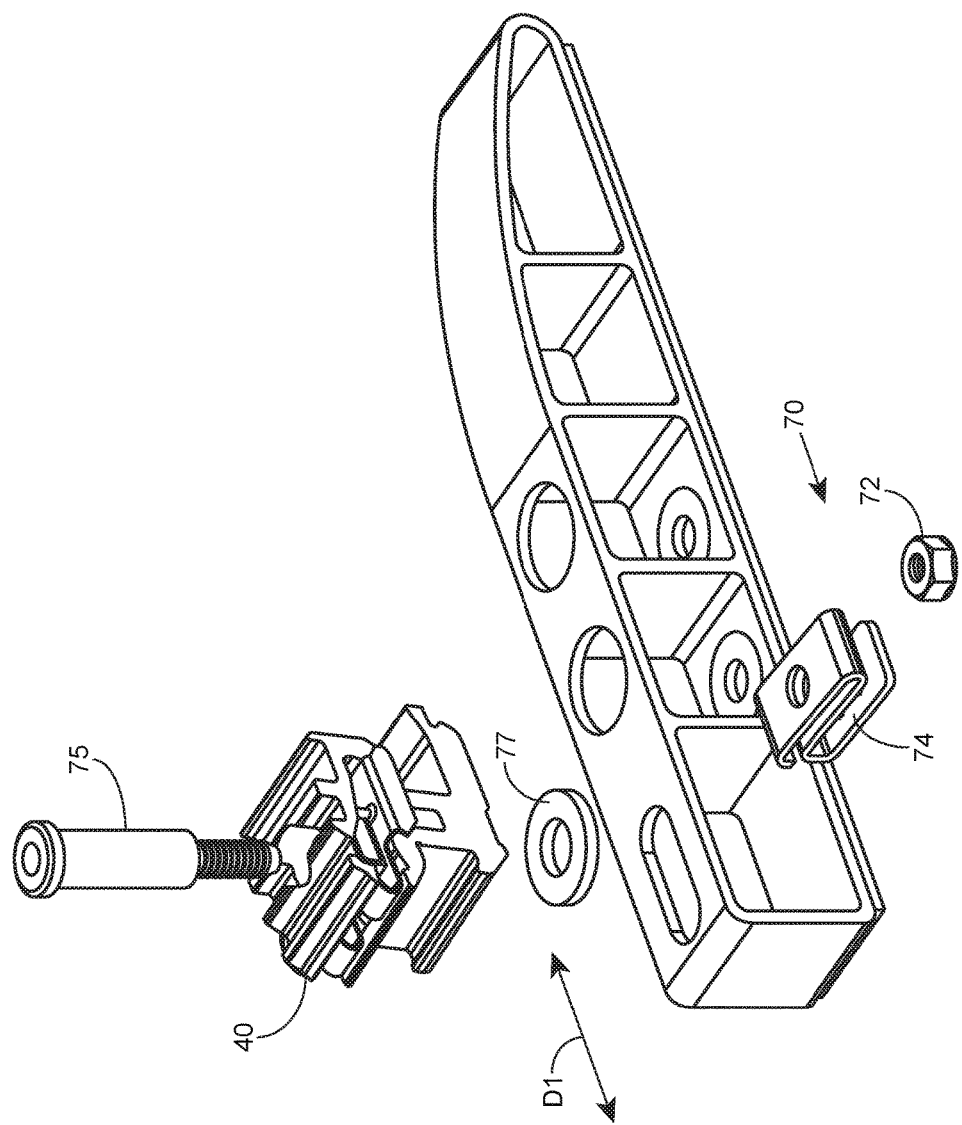
FIG. 11 is an exploded perspective view of a mounting system having a captive nut and nut holder according to various embodiments of the invention.
Figure 12:
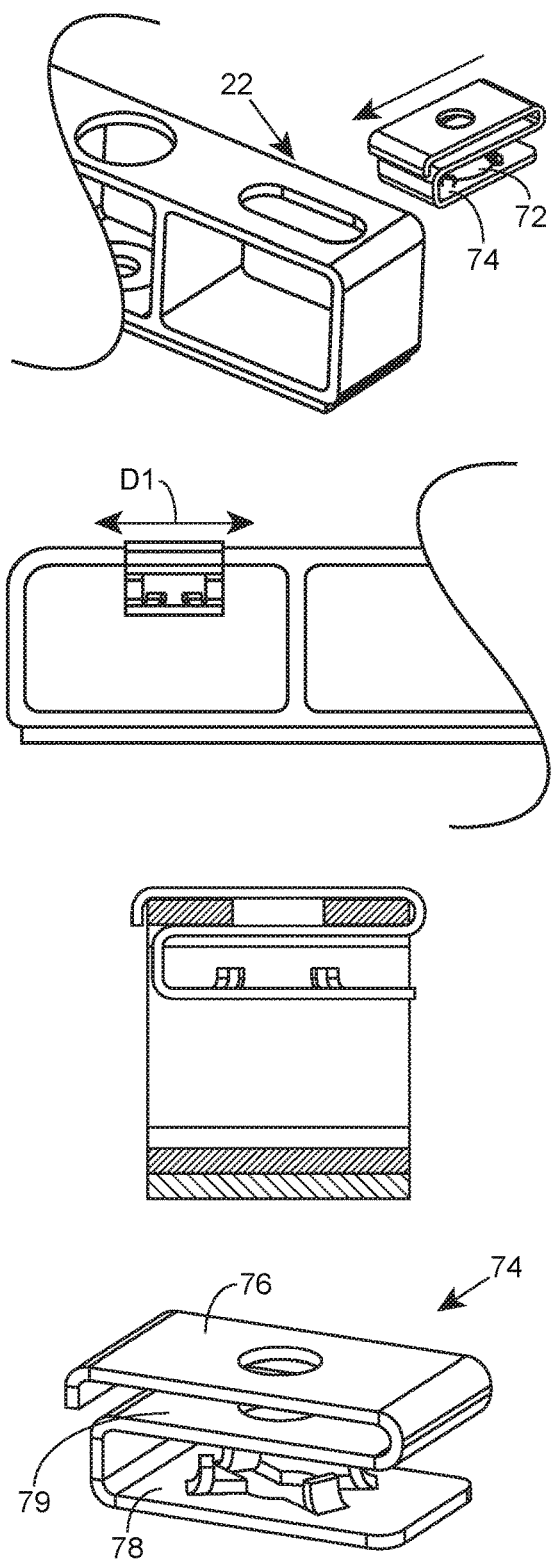
FIG. 12 illustrates installation and positioning of the captive nut system of FIG. 11.

FIG. 11 is an exploded perspective view of system 10 with an optional captive nut and nut holder system 70. Captive nut holder system 70 can include a captive nut 72 and nut holder 74. Nut 72 can provide a location to receive the lower end of bolt 75, which passes through connector 40, washer 77 and nut holder 74. Advantageously, bolt 75 is accessible from directly above assembly 10. As a result, should it be necessary to remove connector 40, an installer can remove connector 40 from assembly 10 when the installer is standing above assembly 10. As shown in FIG. 12, nut holder 72 can be S-shaped having top flange 76, center flange 79 and bottom flange 78.

In operation, nut holder 74 grabs onto base 20 permitting some sliding movement of nut 72 back and forth under slot 22 in direction D1. Specifically, top flange 76 and center flange 79 of nut holder 74 can be received around the top panel of base 20 as shown, with top flange 76 being curved downwardly at one end to wrap partially around the top panel of base 20. As such, nut holder 74 is slidable along the top panel of base 20.

This sliding motion of nut holder 74 and nut 72 permits connector 40 to slide back and forth slightly in direction D1. This sliding motion adds to the positional adjustability of modules 110 and 120 both during installation. As can be seen, nut holder 74 optionally includes upper flange 76 that is slipped over the top edge of base 20 and lower flange 78 that holds screw 72 therein. Specifically, bottom flange 78 may include upwardly facing projections that hold nut 72, and prevent nut 72 from rotating as bolt 75 is rotated. Such upwardly facing projections on bottom flange 78 may be hex-shaped.

One advantage of bolt 75 passing through connector 40 (and being accessible from above) is that it permits a defective photovoltaic module to be removed after installation. Specifically, as part of removing a column of modules to access the defective module, the installer simply unscrews bolt 75 from above such that connector portion 40 can be lifted away from base 20, thereby permitting removal of the defective module supported by connector portion 40. Moreover, another advantage of the present system is that the removal of connector portion 40 can be accomplished without having to remove base 20 from the surface of roof R. After the repair has been completed (and the defective module has been swapped out for a new module), connector portion 40 can quickly be re-installed by inserting and tightening screw 75 from above. Furthermore, another advantage of the system is that the length of slot 22 permits connector portion 40 to be re-installed at a slightly different location with respect to base 20 after the repair. For example, connector portion 40 can be slid forward or backward slightly in slot 22 in direction D1 prior to bolt 75 being re-tightened into nut 74. This provides added flexibility in case the replacement module is not installed in exactly the same position as the module it is replacing.

Figure 13:
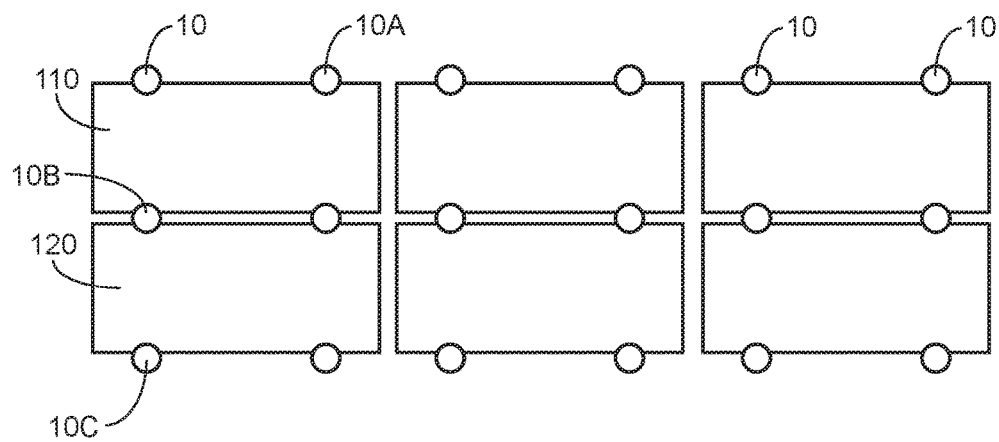
FIG. 13 is a top plan schematic of a photovoltaic array incorporating a mounting system according to various embodiments of the invention.
Figure 14:
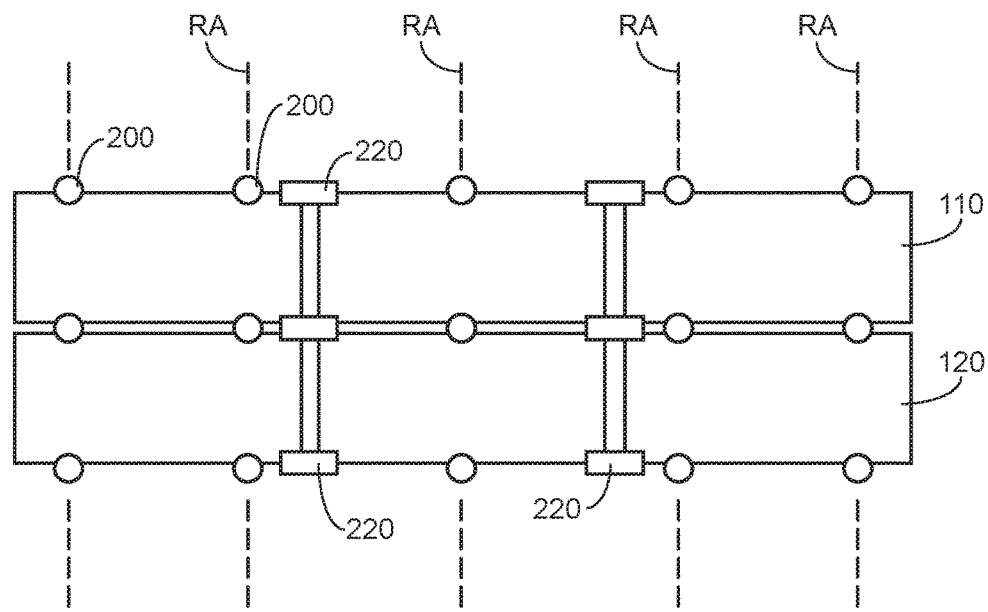
FIG. 14 is top plan schematic of a prior-art photovoltaic mounting system.

FIG. 13 is a top plan view of a photovoltaic array incorporating the present mounting system and FIG. 14 is an illustration of a prior art roof mount system for comparison purposes showing further advantages of the present system. In FIG. 13, three columns of photovoltaic modules 110 and 120 are shown installed on a building roof Modules 110 and 120 are installed as follows: first, a first row of assemblies 10A can be installed onto the roof (assemblies 10A being the same as assemblies 10 as described herein). Next, a first row of PV modules 110 are installed onto assembles 10A. Next, a second row of assemblies 10B can be connected onto modules 110 and lowered into position on the roof and fastened to it (assemblies 10B also being the same as assemblies 10 as described herein, and the preferred method of installation being the same as was described above with respect to assemblies 10). Then, a second row of modules 120 is then attached onto assemblies 10B (preferably using the installation method as described above). Finally, a third row of assemblies 10C can be connected onto modules 120 and then lowered onto the roof surface for attachment to the roof (assemblies 10C being the same as assemblies 10 as described above). This process can be repeated, adding successive rows of photovoltaic modules to the array. It is to be understood that additional photovoltaic modules can be installed using the above described methods to form the final assembled array. As seen in FIG. 13, each photovoltaic module (110 or 120) is supported at four locations by assemblies 10. As is also seen in FIG. 13, each of the three columns of modules need not be connected to an adjacent column of modules. Instead, each module 110 can be connected to two assemblies (two of 10A and two of 10B), and each module 120 can be connected to two assemblies (two of 10B and two of 10C). However, no module 110 needs to be connected to an adjacent module 110. Similarly, no module 120 needs to be connected to an adjacent module 120. This approach makes installation of the array fast and easy to accomplish, since the installer need only progress along a single column at a time adding additional photovoltaic modules to the column. Moreover, as will be further explained below, the installer is able to progress along the column of modules without having to reach back up over an installed module. This advantage is provided because each assembly 10 is secured to roof R after being secured to the first module 110 and then need not be touched again by the installer when the second module 120 is secured thereto. Rather, the installer can back up on roof R and stand away from assembly 10 when securing second photovoltaic module 120 to assembly 10.

FIG. 14 shows the positioning of a traditional array. Specifically, connectors 200 may be standard mounting feet spaced apart at a preferred distance across the array. The spacing between feet 200 may result in placement of connectors 200 at uneven spacings along the sides of modules 100 and 120. As a result, a second type of connector assembly 220 is required to prevent excessive cantilever in the modules. For example, the middle column of modules 110 and 120 are only connected to the roof by one connector 200 located mid-way along the sides of the modules. A second connector 220 is thus needed at the ends of these modules such that the ends of the modules are supported. Second assembly 220 may be a module-to-module interlock, and need not be supported from below. As can be appreciated by comparing FIGS. 13 and 14, the present system (FIG. 13) only requires one type of assembly (i.e.: assemblies 10), whereas other existing systems (FIG. 14) would specifically require two different types of connecting assemblies (i.e.: connectors 200 and 220). Thus, an advantage of the present system is that only one assembly be required (i.e.: assembly 10) to mount the entire photovoltaic array. This can speed the time to install the array. This can also reduce the cost of materials required to assemble the array. Additionally, with the present system, a placement conflict between two different types of connectors on the same system does not occur. However, as seen in FIG. 14, this placement conflict can easily occur between connectors 200 and 220 in traditional systems. Such placement conflicts typically require additional hardware or hardware that incorporates aspects of both assemblies (i.e.; a mechanism incorporating elements of connectors 200 and 220 within the same assembly).

Installation of assembly 10 is shown in successive FIGS. 15A to 15F, described below.

FIG. 15A shows edge of first photovoltaic module 110 as it can be held in the air above the roof surface by the installer (e.g.: with one hand) above roof surface R while holding mounting system 10 with the other hand. The installer need not lift first photovoltaic module 110 very high above roof surface R. Rather, first photovoltaic module 110 need only be lifted a distance sufficient for the installer to rotatable lock connector portion 40 onto module 110, as follows.

Figure 15B:
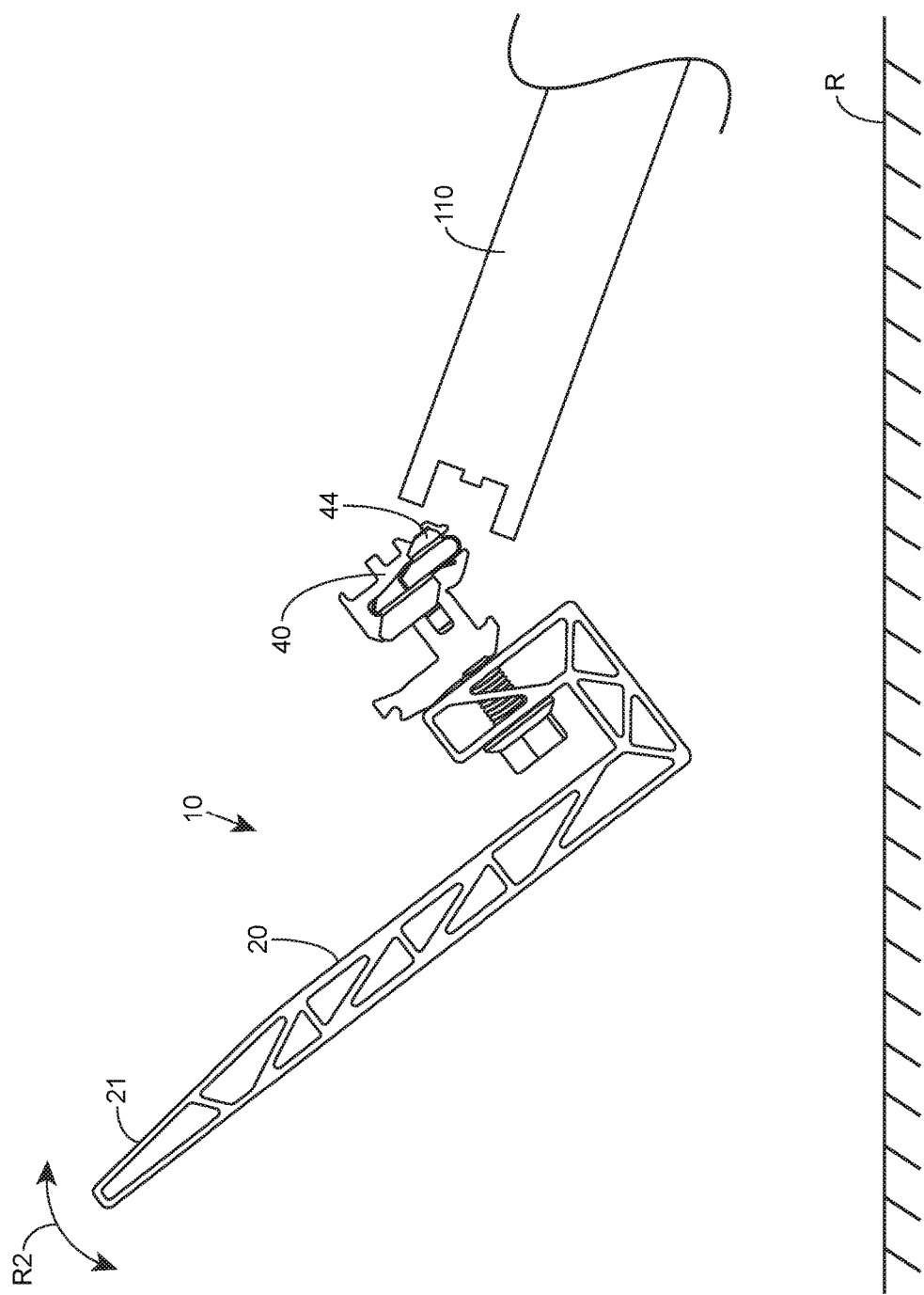
FIG. 15B is a second step in assembling a photovoltaic array using a mounting system according to various embodiments of the invention.
Figure 15C:
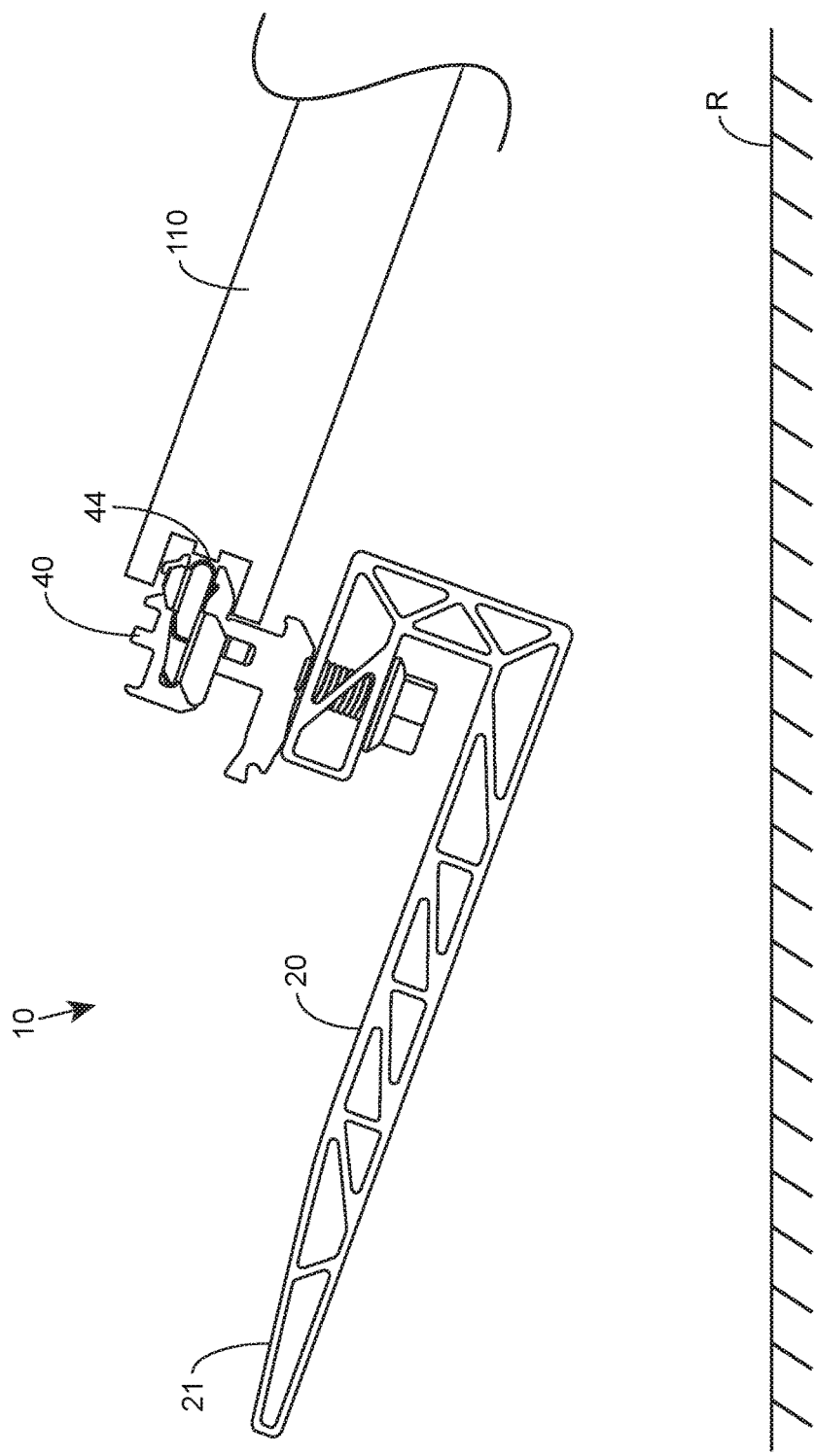
FIG. 15C is a third step in assembling a photovoltaic array using a mounting system according to various embodiments of the invention.

FIGS. 15B and 15C shows sequential steps in which the installer can rotate base 20 and connector portion 40 with respect to first photovoltaic module 110 such that connector portion 40 rotatably locks onto or into an edge of first photovoltaic module 110. The installer can simply hold the edge of the first photovoltaic module 110 away from the roof surface with one hand and rotatably lock connector portion 40 onto the edge of first photovoltaic module 110 with the other hand.

In one preferred embodiment, connector portion 40 can be the type of connector described in Published U.S. Patent Application 2014/0175244, entitled "Connecting Component For Photovoltaic Arrays" which is designed to receive first and second photovoltaic modules on opposite sides thereof, wherein the modules have side edges that are pivot-locked onto the connector.

Specifically, this process of attaching connector portion 40 onto the side edge of module 110 may optionally comprise inserting tongue 44 on connector portion 40 into side groove 111 in first photovoltaic module 110 and then rotating connector portion 40 to lock the connector onto first photovoltaic module 110. However, in alternate embodiments, the present system can be used with modules that do not have grooved frames. For example, connector portion 40 can instead be a connector that wraps around the top and bottom edges of the module frame (e.g., clamping connector), or a connector into which the edges of the module frames are inserted. Optionally, connector portion 40 may also be a connector used with frameless modules.

Elongated base 20 can be narrow with tapered end 21 acting as a lever when held by an installer and rotated by hand to lock onto first photovoltaic module 110. Specifically, rotatably locking connector portion 40 into or onto the edge of first photovoltaic module 110 can involve manually rotating elongated base 20 downwardly in direction R2 such that connector 40 snaps onto, or into, or around, the side edge first photovoltaic module 110. As such, the present reference to "rotatably connecting" can be understood to involve any motion in which connector portion 40 is moved with respect to first photovoltaic module 110 to connect connector portion 40 onto the side edge of first photovoltaic module 110.

Figure 15D:
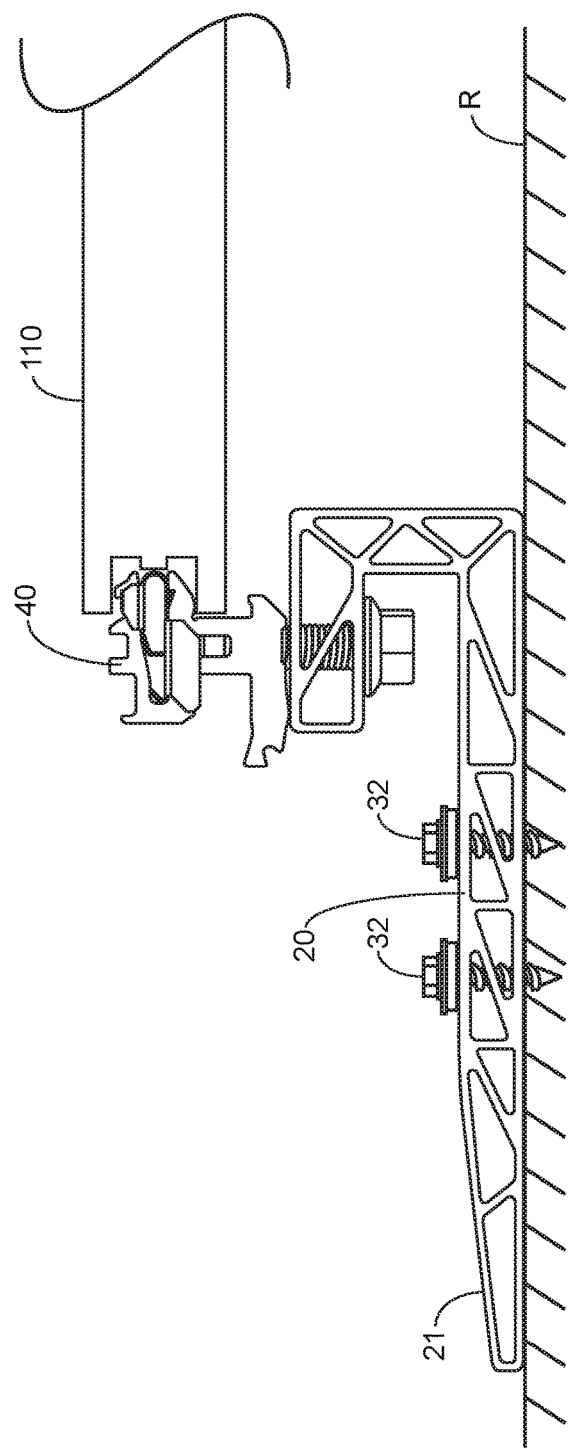
FIG. 15D is a fourth step in assembling a photovoltaic array using a mounting system according to various embodiments of the invention. <Same comment as 15A regarding the drawing figure.>

FIG. 15D shows how an installer can next lower the edge of first photovoltaic module 110 such that elongated base 20 (and its optional sealing base 25 below) is now sitting on roof R. At this time, the installer can use a power tool to tighten screws 32, thereby securing elongated base 20 directly onto metal roof R. At this time, the installer can also adjust the position of screw 42 (FIG. 3) or bolt 75 (FIG. 11) back and forth in direction D1 within slot 22, and can also adjust the rotation angle of connector portion 40 around axis R1 so as to ensure the best placement of connector portion 40 onto the edge of first photovoltaic module 110. Screws 32 can be positioned rather close to connector portion 40 along the length of base 20 as shown. An advantage of this placement of screws 32 is that a shorter lever arm is provided, such that lateral forces (i.e.; forces parallel to the roof surface) on connector portion 40 do not tend to pull screws 32 out of the roof.

Figure 15E:
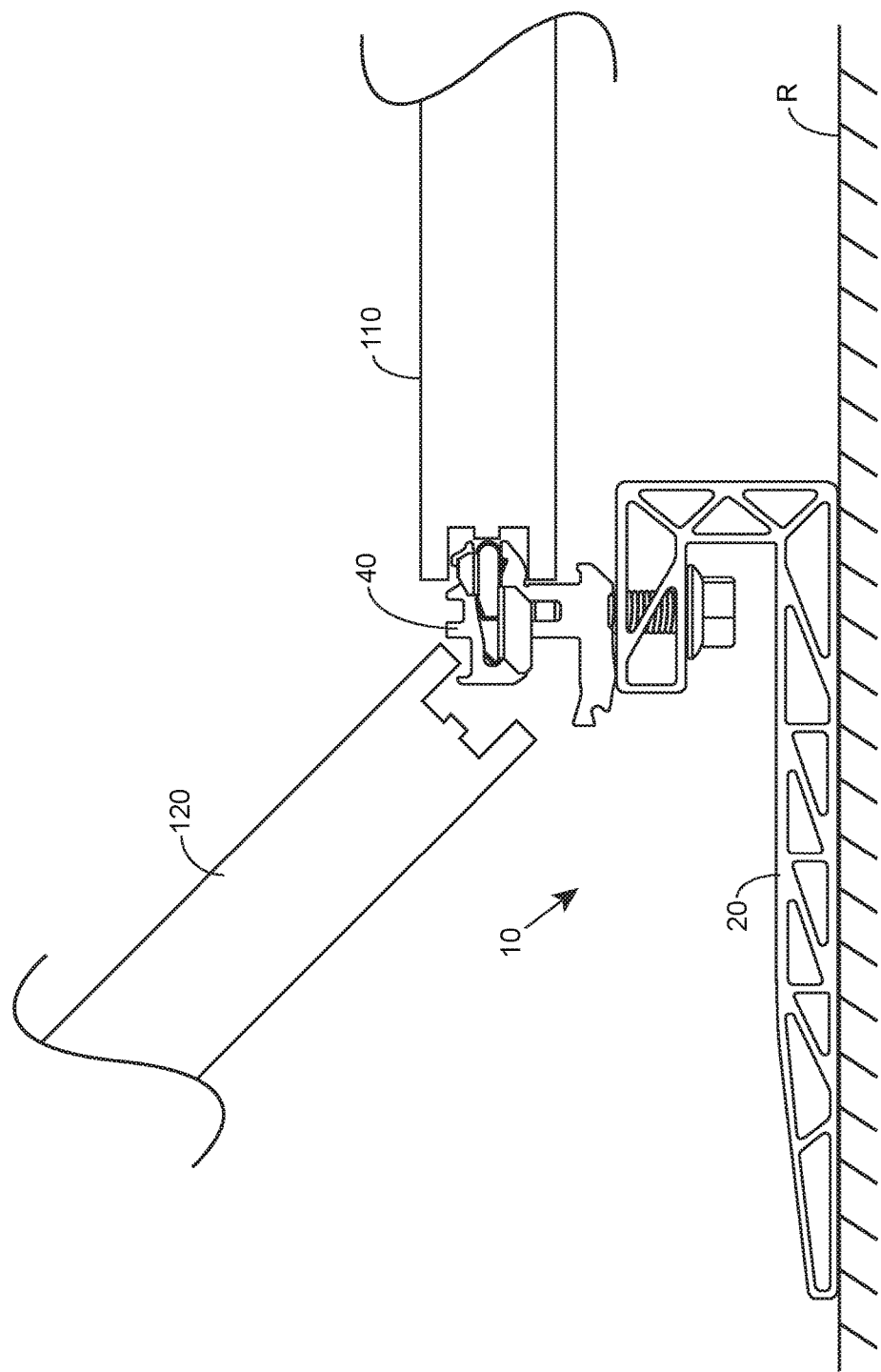
FIG. 15E is a fifth step in assembling a photovoltaic array using a mounting system according to various embodiments of the invention.
Figure 15F:
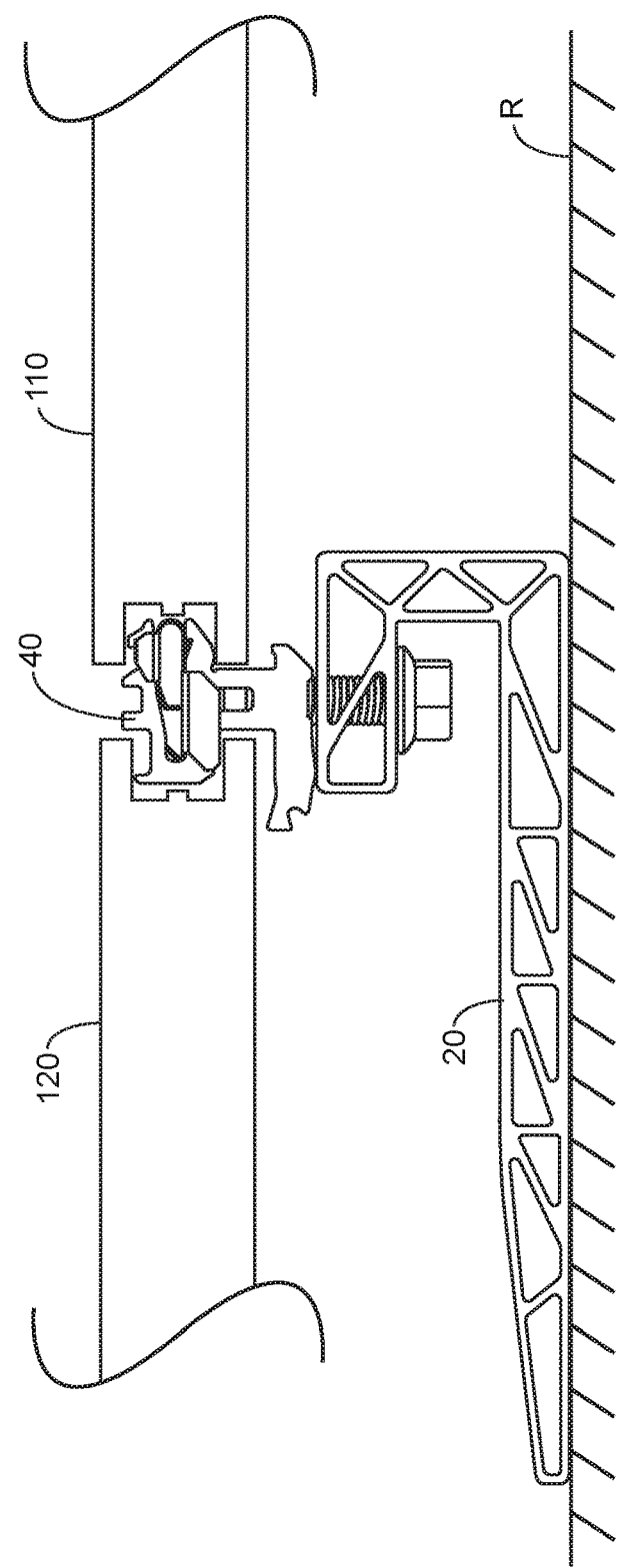
FIG. 15F is a sixth step in assembling a photovoltaic array using a mounting system according to various embodiments of the invention.

FIG. 15E shows how the edge of the second photovoltaic module 120 can be rotatably attached onto connector portion 40 on a side opposite to that of first photovoltaic module 110. First, an edge of second photovoltaic module 120 is placed onto connector portion 40 when the second photovoltaic module is held at an angle to the roof surface, as shown. Finally as shown in FIG. 15F, second photovoltaic module 120 is rotated downwardly towards the roof, thereby attaching second photovoltaic module 120 onto connector portion 40.

The above described technique can be simply repeated with second module 120 becoming first module 110 in the next module position of the array. As a result, the array can be built rapidly with mounting system 10 being a system that is simply snapped onto a first photovoltaic module and then used as a base for receiving a second photovoltaic module thereon.

Figure 16:
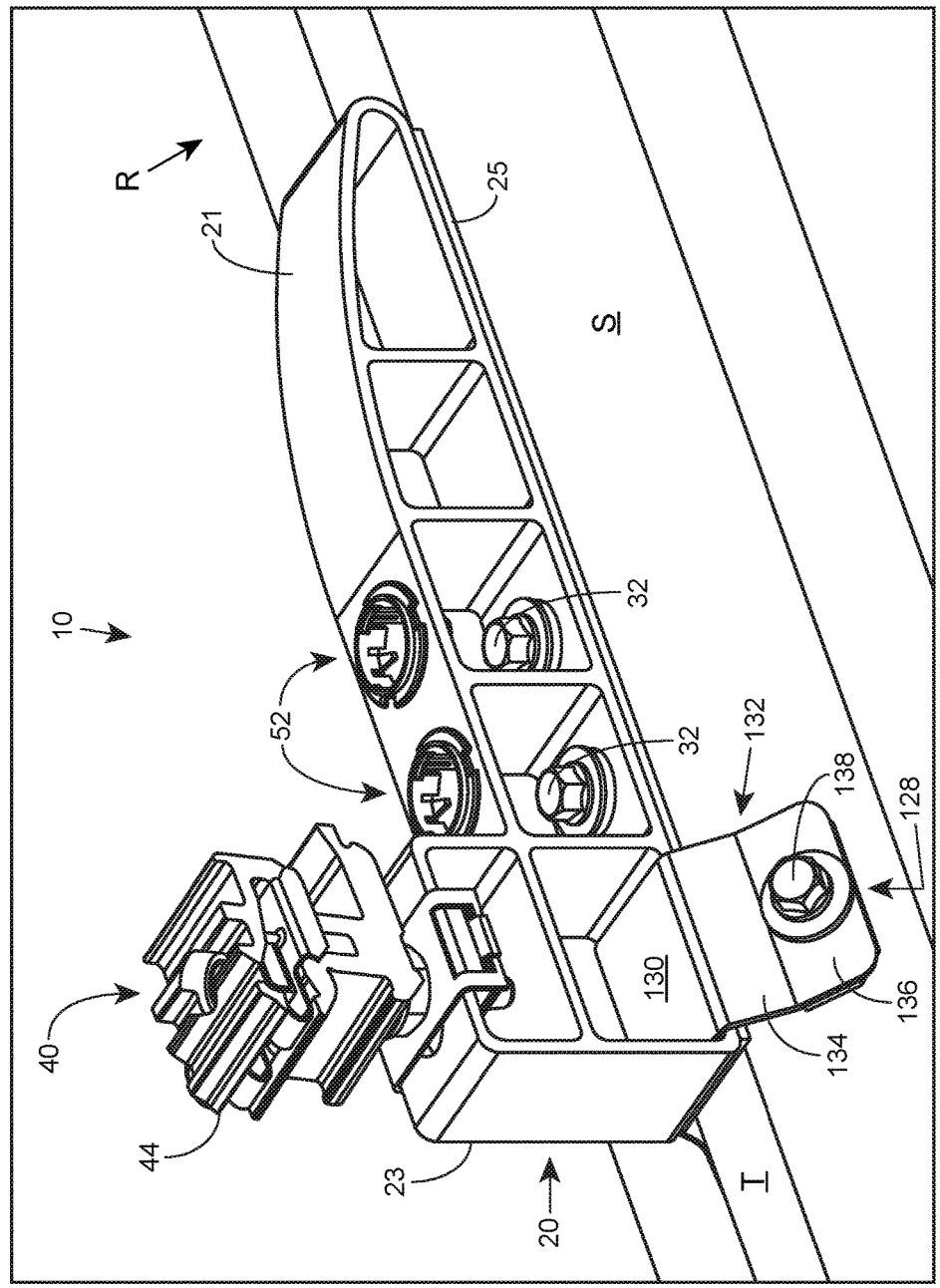
FIGS. 16, 17, and 18 respectively are perspective, end, and side views of a mounting system using an additional assistance clamp in accordance with various embodiments of the invention.
Figure 17:
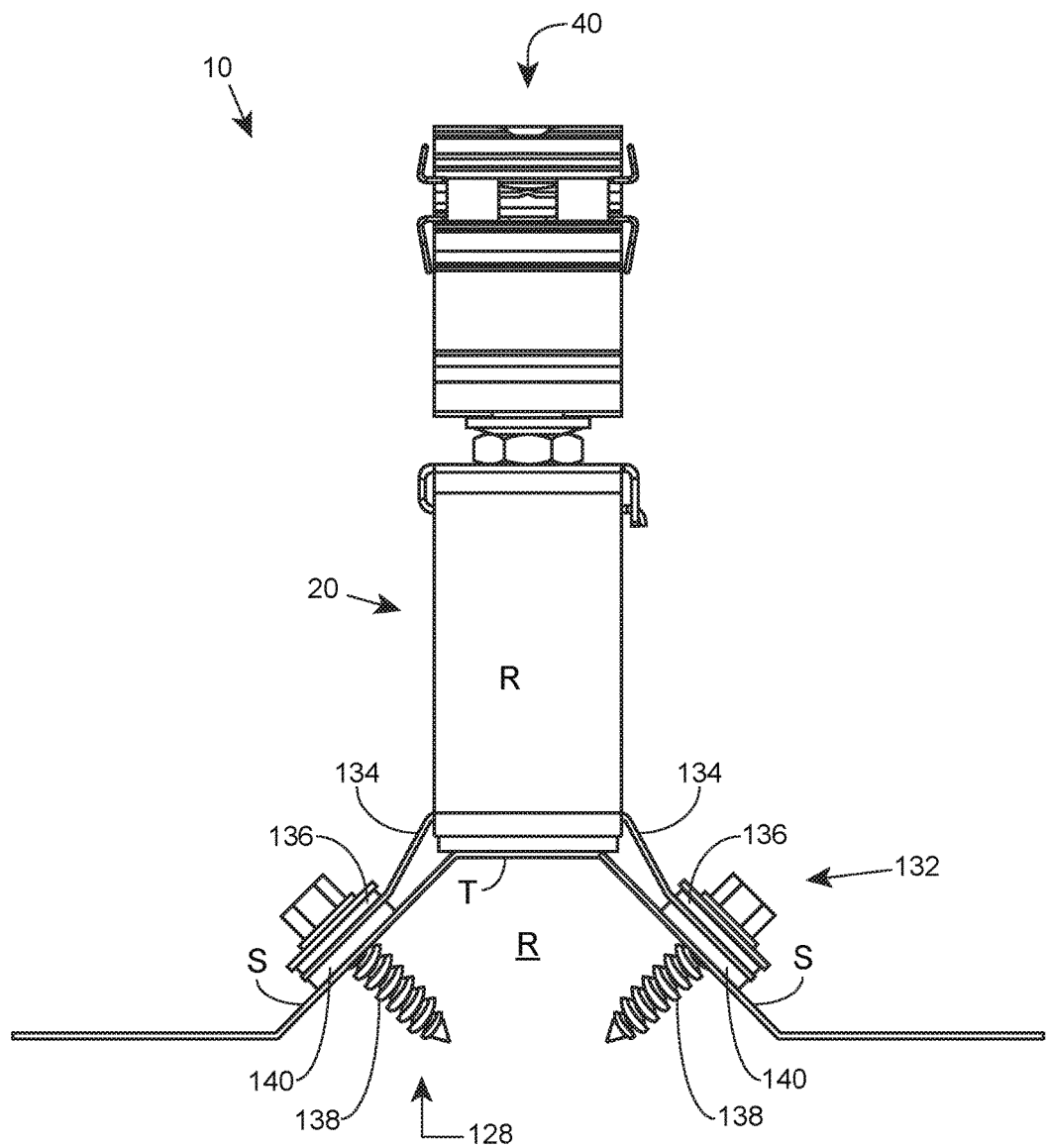
Figure 18:
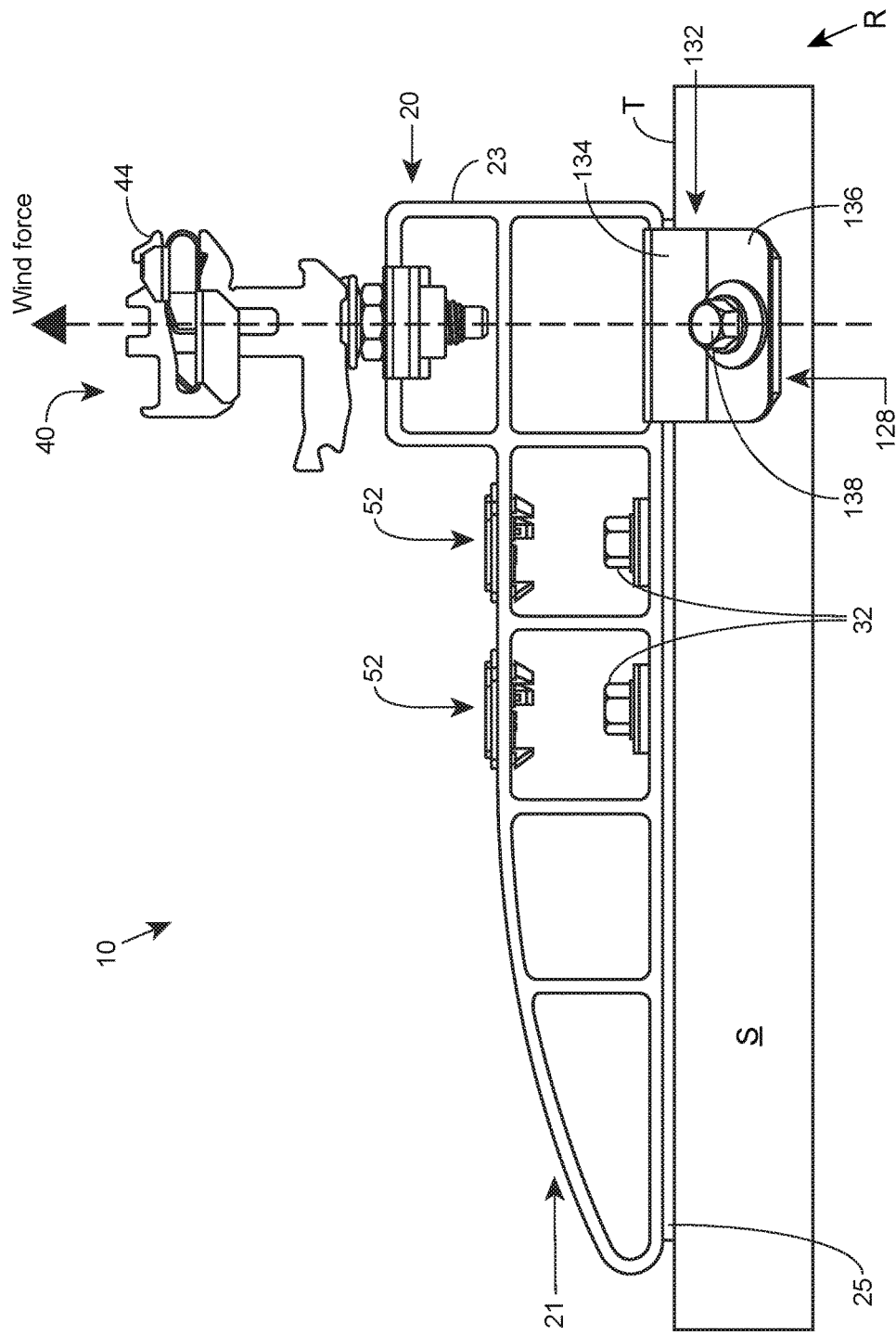

FIGS. 16, 17, and 18 respectively show perspective, end, and side views of mounting assembly 10 attached to roof R, in particular a raised section of trapezoidal roof defined by top portion T raised above descending side portions S. Mounting assembly 10 can be attached to roof R according to the methodology discussed herein. Here, screws 32 have been fastened to roof R to secure connector elongated base 20 onto a top portion of roof R. In some environments, it can be desirable to laterally support the mounting of elongated base 20 onto roof R, particularly in areas, such as coastal regions, were high winds (e.g., greater than 20 mph) are a regular occurrence. Accordingly, assistance clamp 128 (also referred to herein as a strap) can be used as an additional support for connection of elongated base to roof R, which in many cases provides a relatively narrow footprint for supporting mounting assembly 10, which also has a relatively narrow footprint (i.e. a relatively large, positive length to width ratio, e.g., 5:1-10:1). Thus, simply using a wider elongated base 20 may not be an available remedy. This may be true, in particular, where base 20 must rest on a raised portion of a trapezoidal roof and may not be wider than that raised portion.

Assistance clamp 128 can include planar portion 130, which can be configured to fit over a portion of elongated base 20. Here, assistance clamp 128 shown to be vertically aligned with photovoltaic module connector portion 40, which is a location where increased tension and shear forces can load elongated base 20 as a result of wind forces against one or more connected PV modules. This is demonstrated at FIG. 18, which shows wind forces acting directly at connector portion 40. However, assistance clamp 128 can be placed along any portion of elongated base 20, and more than one assistance clamp 128 can be used in conjunction with one of elongated base 20 in spite of only one of assistance clamp 128 being shown.

Planar portion 130 is shown located at the lowest relative level (i.e. closest to top portion T of roof R) of elongated base 20, however, planar portion 130 can be located at a relatively higher level (i.e. closest to photovoltaic module connector 40) than shown and elongated base 20 can include one or more specific elevated portions for supporting planar portion 130. Planar portion 130 can extend along a plane to a pair of attachment tabs 132 that extend angularly at non-zero angles (e.g., 10-90 degrees) away from the planar portion 130. Each of attachment tabs 132 can include first portion 134 that extends between planar portion 130 and second portion 136, which is angularly displaced from first portion 134. Second portion 136 can include a through-hole dimensioned to receive fastener 138 for attachment to side portion S of roof R, or for the use of self-tapping type fasteners, pilot holes for guiding fasteners 138. While only one of fastener 138 is shown for each attachment tab 132, more than one of fastener 138 can be used for each attachment tab 132.

Attachment of each second portion 136 to side portions S of roof R can be performed such that first portions 134 become tensioned freely in air, as shown at FIG. 17, between planar portion 130 and second portions 136. This tensioned assembly method can help prevent unwanted lateral movement that would occur due to otherwise mounting "slop" of assistance clamp 128. In some embodiments, assistance clamp 128, and in particular first portion 134, can include other and/or additional tensioning elements (e.g. cables, tie-rods) to help prevent lateral movement of elongated base 20. Tensioning can occur from mounting second portions 136 such that fasteners 138 compress against side portions S of roof R during the fastening process and thereby tension first portions 134 with a resulting pulling force. Use of support base 140 can help provide a tight interface between second portions 136 and side portions of roof R. Support base 140 can be constructed from a relatively soft material (e.g. rubber) so as to compress during tightening of fasteners 138 to help tension first portions 134.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

What is claimed is:

1. A photovoltaic mounting system comprising:
   an elongated connector base having a bottom portion connected to a top roof portion, the top roof portion being flanked by side roof portions leading away from the top roof portion;
   a photovoltaic module connector connected to a top portion of the elongated connector base;
   an assistance clamp connected to a bottom portion of the elongated connector base, the assistance clamp having a pair of attachment tabs configured for supporting fasteners that connect to the side roof portions,
   wherein the assistance clamp comprises a planar portion extending through a passage within the elongated connector base,
   wherein each of the pair of attachment tabs project away from the planar portion, and
   wherein each attachment tab is arranged to receive a mechanical fastener to secure opposite sides of the elongated connector base to the side roof portions.

2. The system of claim 1, wherein the assistance clamp is vertically aligned with the photovoltaic module connector at one end of the elongated connector base.

3. The system of claim 1, wherein the planar portion extends along a plane and wherein each of the pair of attachment tabs extend at non-zero angles with respect to the plane.

4. The system of claim 1, wherein each of the pair of attachment tabs comprises a first portion configured to laterally stabilize the elongated connector base and a second portion angularly displaced from the first portion for receiving the mechanical fastener.

5. The system of claim 4, wherein the first portion is tensioned between the second portion and the planar portion.

6. The system of claim 5, wherein the first portion spans an air gap between the second portion and the planar portion.

7. A photovoltaic mounting system comprising:
   an elongated connector base having a bottom portion connected to an elevated roof portion by at least one primary connector passing through the bottom portion, the elevated roof portion being flanked by side roof portions leading away from the elevated roof portion;
   a photovoltaic module connector connected to a top portion of the elongated connector base; and
   a tensioning strap passing through a passage within a bottom portion of the elongated connector base, the tensioning strap being placed into tension between fasteners that connect to the side roof portions.

8. The system of claim 7, wherein the length to width ratio ranges from 5:1 to 10:1.

9. The system of claim 7, wherein the bottom portion of the elongated connector base has a positive length to width ratio.

10. The system of claim 7, wherein the strap is placed through elongated connector base to align with the photovoltaic module connector at one end of the elongated connector base.

11. The system of claim 7, wherein the tensioning strap comprises first and second attachment tabs that angularly extend from elongated connector base.

12. The system of claim 11, wherein each of the first and second attachment tabs comprise portions that are tensioned freely in air between the fasteners and the elongated connector base.

13. The system of claim 12, wherein each of the first and second attachment tabs comprises fastener support portions having holes for receiving the fasteners, the holes being aligned with support bases positioned between the side roof portions and the fastener support portions.

14. The system of claim 13, wherein the support bases are compressed between the side roof portions and the fastener support portions.

\* \* \* \* \*